May 11, 1965  A. R. CHASAR  3,182,823
TRANSFER EQUIPMENT

Filed Aug. 15, 1962  9 Sheets-Sheet 1

INVENTOR.
ANTHONY R. CHASAR
BY
Meyer, Baldwin, Doran & Egan
ATTORNEYS

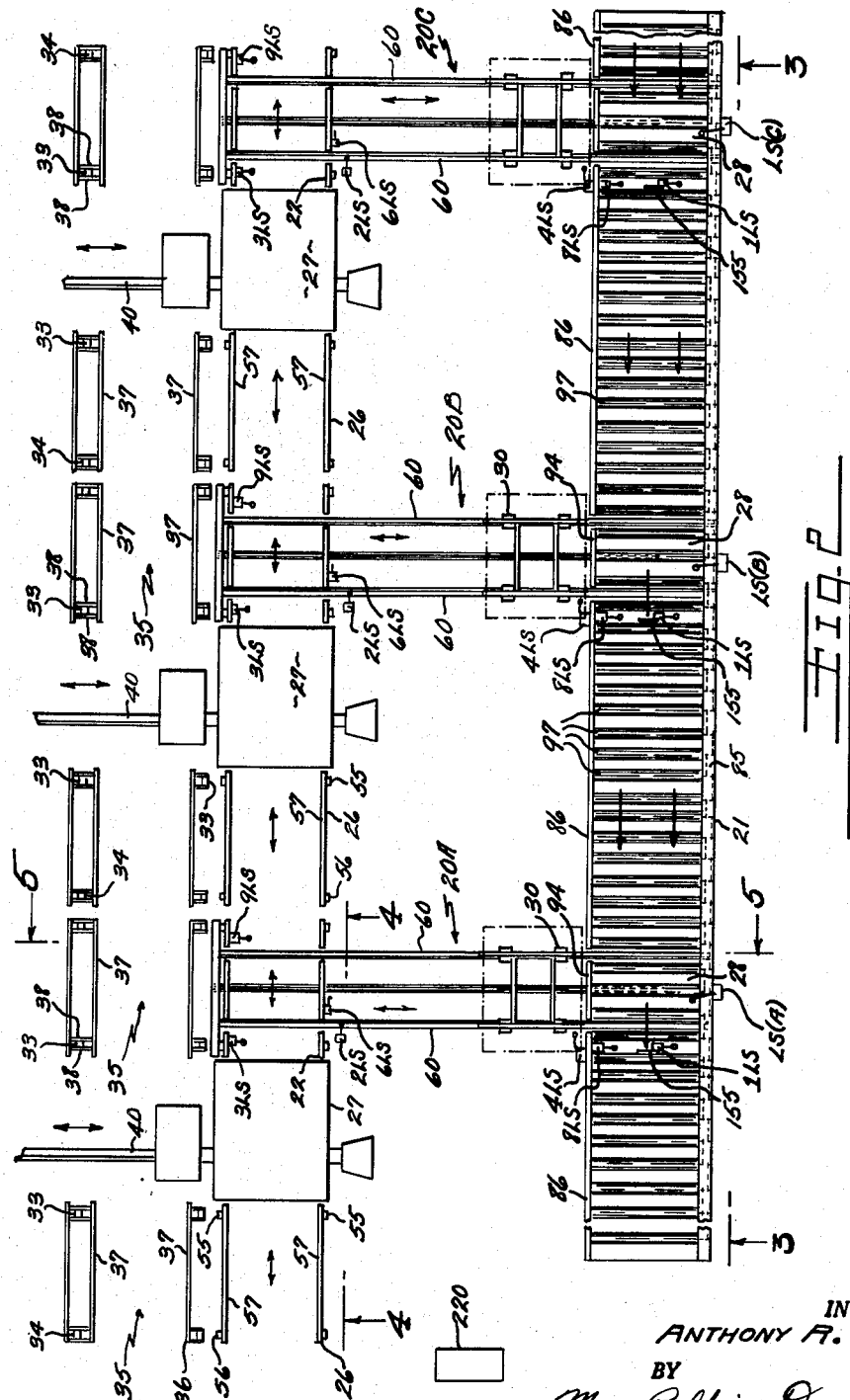

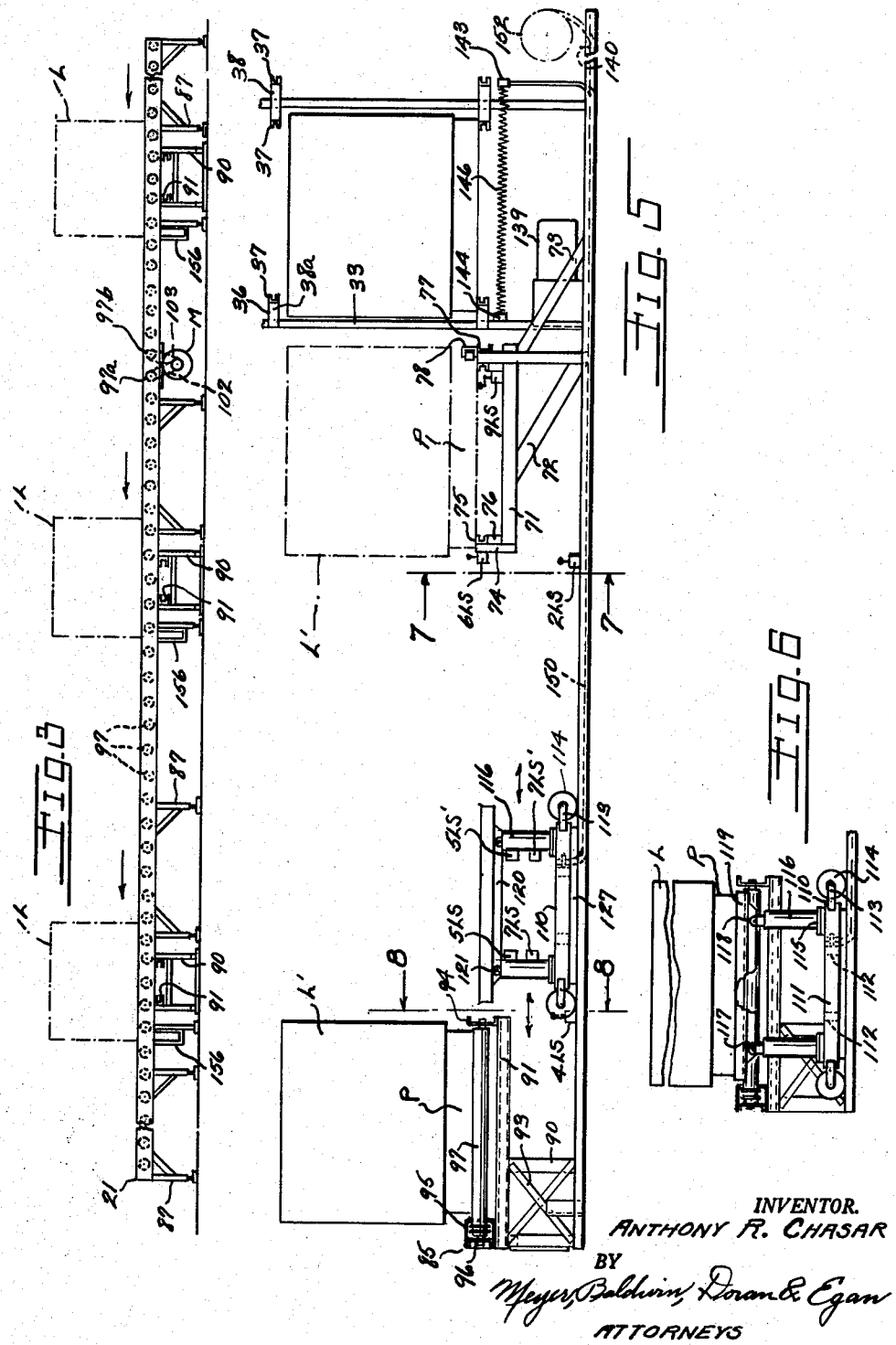

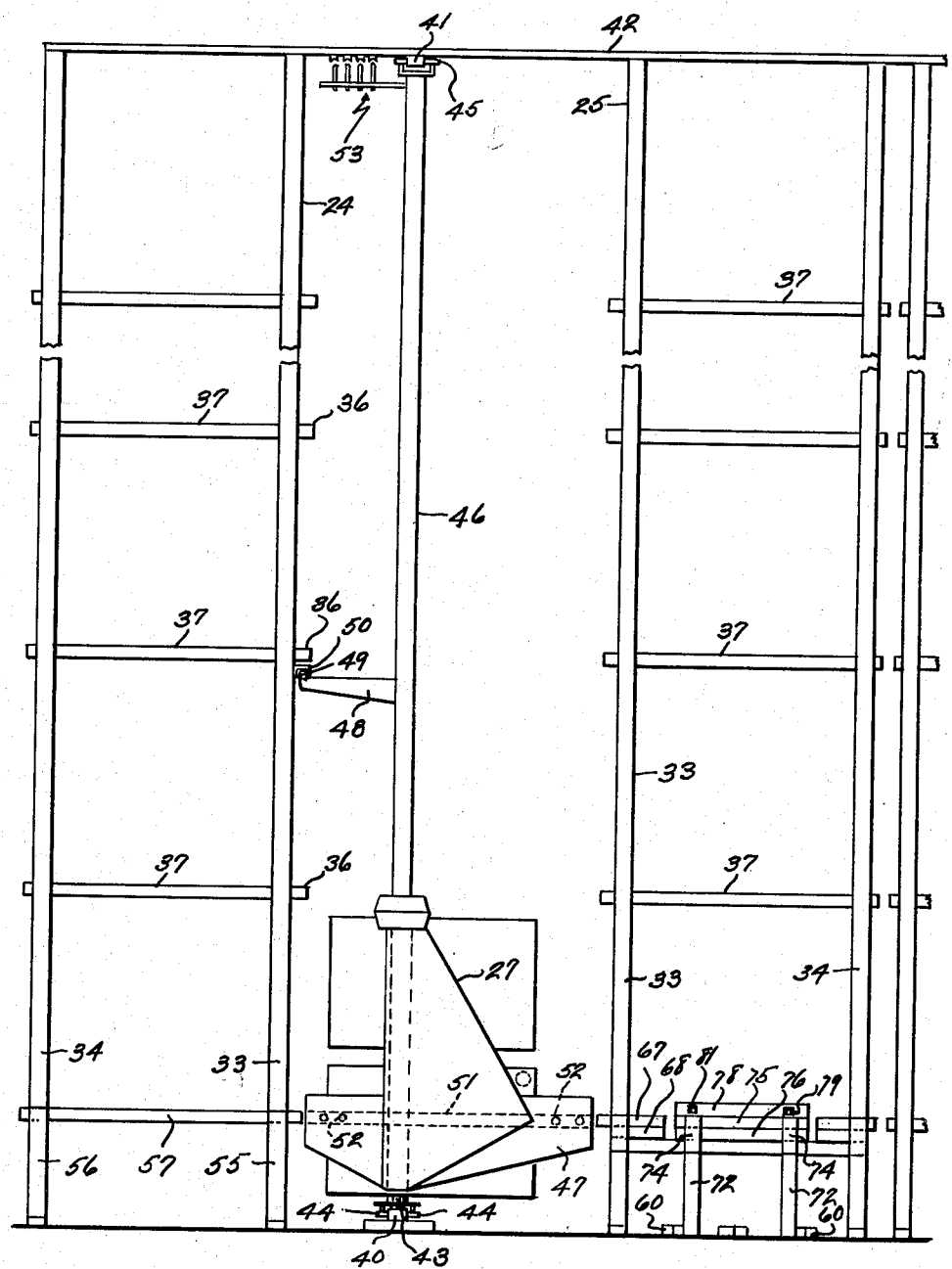

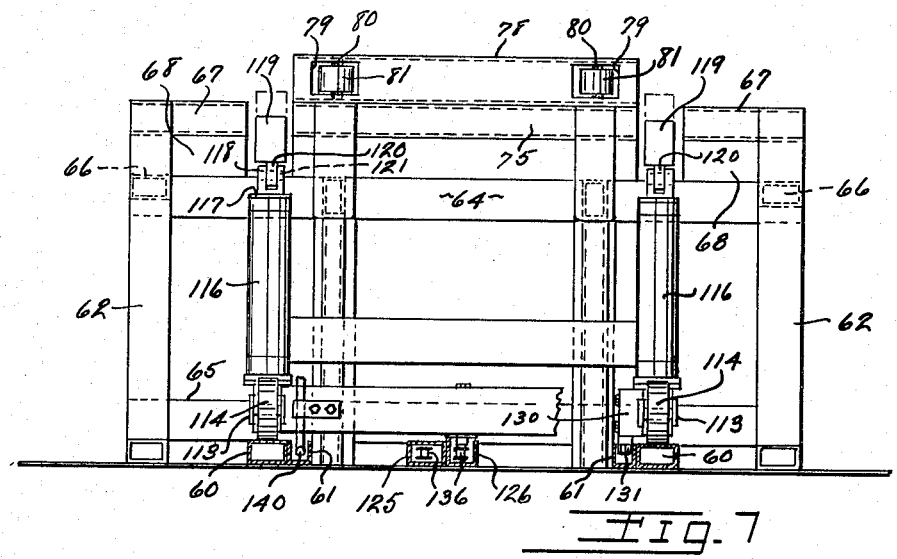

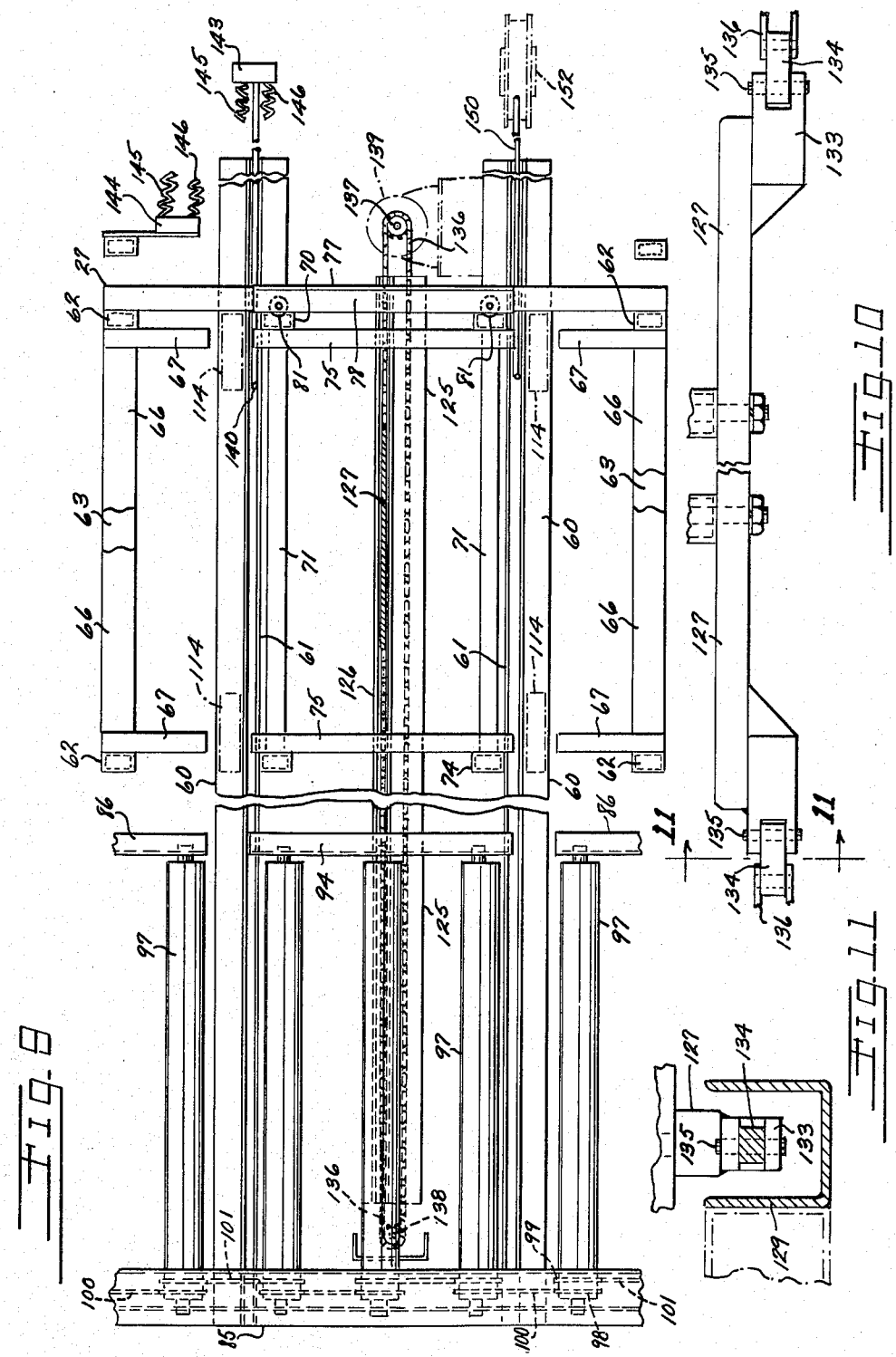

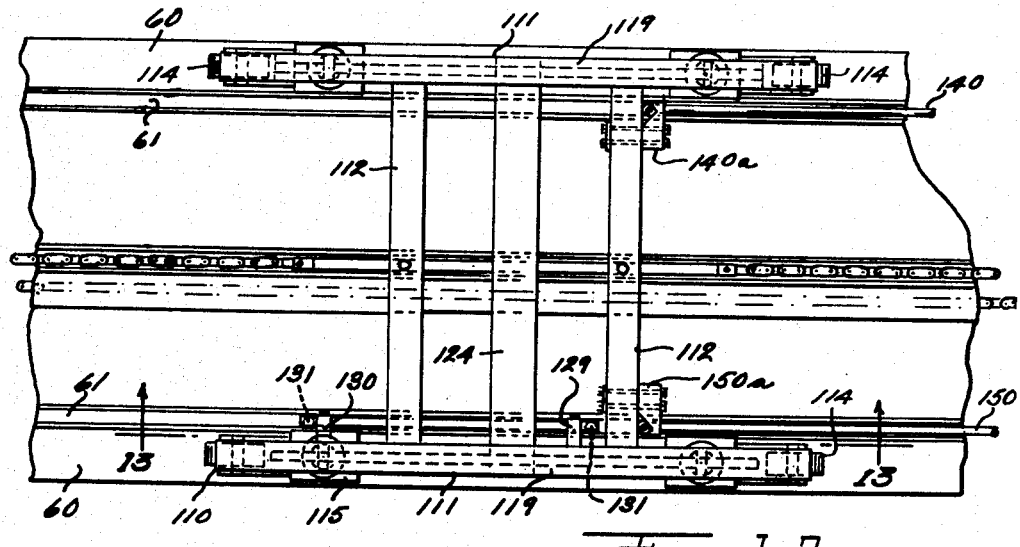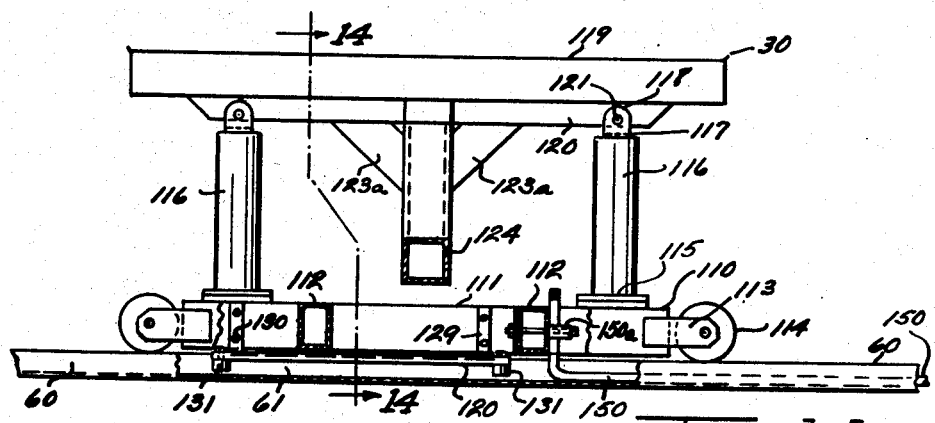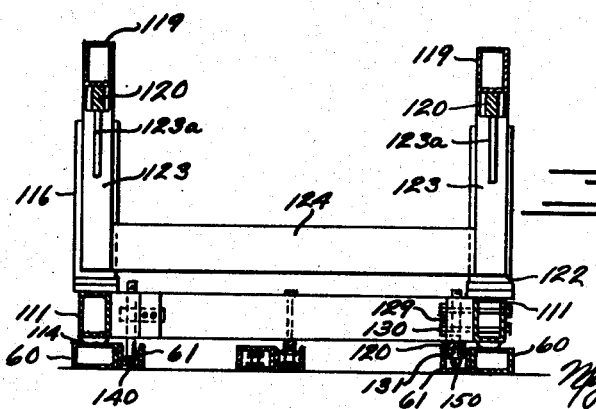

United States Patent Office 3,182,823
Patented May 11, 1965

3,182,823
TRANSFER EQUIPMENT
Anthony R. Chasar, Cleveland, Ohio, assignor to The Triax Company, Cleveland, Ohio, a corporation of Ohio
Filed Aug. 15, 1962, Ser. No. 217,100
13 Claims. (Cl. 214—16.4)

This invention relates to transfer apparatus for delivering loads to and from a mechanized storage system. The invention is particularly adapted for transferring loads from a conveyor to a pick-up and delivery station adjacent to a storage frame of the type having a mechanized carrier for further depositing the loads at selected support means of the frame. The invention is further adapted for returning a load from the pick-up and delivery station to the conveyor.

The general object of the invention is to provide a mechanized, remotely controlled transfer apparatus whereby loads are quickly and efficiently transferred from one position or station to another to be subsequently maneuvered or otherwise acted upon in any desired manner.

More specifically, the invention has for an object the provision of a transfer vehicle co-operant with a conveyor station and a remotely situated pick-up and delivery station for lifting a load from one of said stations, transferring it to the other of said stations, and depositing it at said other station.

Another object of the invention is to provide an apparatus of the type referred to having the added feature of a parking position for the transfer vehicle, separate from either of the stations, for loading or unloading manually or by other suitable means.

A further object is to provide, in a transfer apparatus as set forth above, an automatic control system including suitable safety features for preventing collision between different loads or interference between the transfer vehicle and the storage frame carrier and means otherwise generally co-ordinating the movements of the conveyor, transfer vehicle, and storage system carrier.

Still another object of the invention is to provide transfer apparatus having the above features adapted to be installed in multiples for transferring loads between a single conveyor and a plurality of load storage frames constituting an extensive warehousing system.

Other objects of the invention and the invention itself will be understood from the following specification and the accompanying drawings of one embodiment of the invention, in which said drawings:

FIG. 2 is an enlarged plan view of the plurality of transfer apparatuses shown in FIG. 1;

FIG. 3 is a front elevation of the conveyor of FIGS. 1 and 2 as viewed from the line 3—3 of FIG. 2;

FIG. 4 is a front elevation of a carrier and associated storage frame assembly as viewed from the line 4—4 of FIG. 2;

FIG. 5 is a partial section of one of the transfer apparatuses of this invention as viewed from the line 5—5 of FIG. 2;

FIG. 6 is a side elevation of the transfer vehicle shown at the conveyor station;

FIG. 7 is a section taken along the line 7—7 of FIG. 5 showing the pick-up and delivery station in front elevation with the transfer vehicle positioned thereat;

FIG. 8 is a section taken along the line 8—8 of FIG. 5 showing the conveyor station in rear elevation;

FIG. 9 is a substantially enlarged plan view, partially broken away, of the conveyor and pick-up and delivery stations and the means for propelling the transfer vehicle;

FIG. 10 is a side elevation of a vehicle anchor member shown also in FIG. 7;

FIG. 11 is a vertical section taken along the line 11—11 of FIG. 10 showing the anchor member disposed within a chain guide trough;

FIG. 12 is a top plan view of the transfer vehicle;

FIG. 13 is a section taken generally along the line 13—13 of FIG. 12, portions thereof being cut away;

FIG. 14 is a section of the transfer vehicle taken generally along the line 14—14 of FIG. 13.

The warehousing system herein illustrated, in which the transfer apparatus of this invention is incorporated, comprises a plurality of pairs of elongated storage frames having an aisle between each pair along which a carrier is adapted to travel. Each storage frame comprises a plurality of bins or compartments, and the carrier is adapted to convey a load to or from any one of the compartments. The type of storage frame and carrier arrangement referred to is fully disclosed in my co-pending application Serial No. 66,776, filed November 2, 1960, now Patent No. 3,139,994, and entitled Mechanical Load Handling, Transfer and Storage Equipment.

Each pair of storage frames is provided adjacent to one end thereof with a pick-up and delivery station from which the carrier is adapted to pick-up, or on which it is adapted to deposit, a load. A conveyor is provided adjacent to but spaced from the same ends of the storage frames, said conveyor being positioned perpendicular to the aisles between the pairs of storage frames. A transfer cart and suitable track means therefor is provided for each pick-up and delivery station for the purpose of shuttling a load between the conveyor and the pick-up and delivery station. The general warehousing system briefly described above is shown schematically in FIG. 1.

Figure 1:
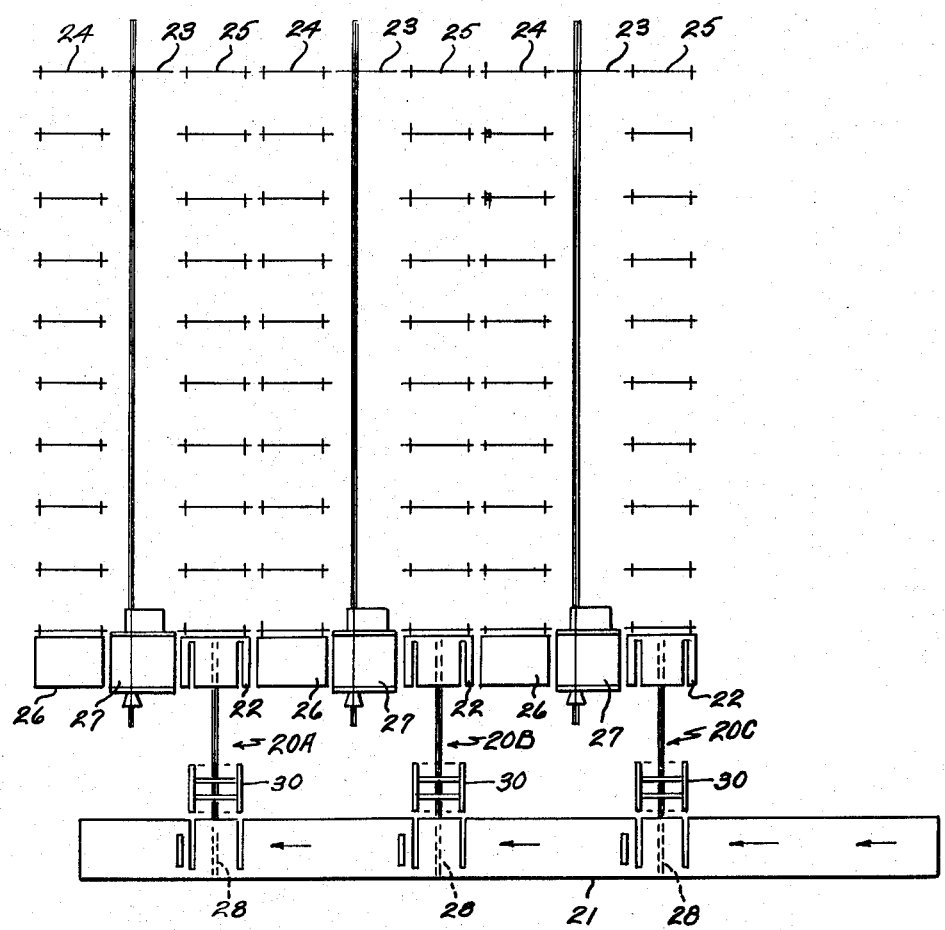
FIG. 1 is a schematic showing of a complete warehousing system incorporating a plurality of the transfer apparatuses of this invention.

The transfer apparatuses are all identical in construction and are indicated generally at 20A, 20B, and 20C in FIG. 1. Only the transfer apparatus 20A will be herein described in detail and it will be understood that such description applies equally to the apparatuses 20B and 20C. It will be further understood that any suitable number of transfer apparatuses may be utilized in connection with a corresponding number of carriers and associated storage frames for transferring loads from a single conveyor.

The transfer apparatuses 20A, 20B, and 20C (FIG. 2) generally connect a conveyor 21 with three pick-up and delivery stations, hereinafter referred to simply as P & D stations 22. Each P & D station serves a storage frame assembly 23 comprising a pair of parallel, spaced storage frames 24 and 25. Each P & D station is disposed adjacent to one end of the associated storage frame 25, and an auxiliary loading station 26 is provided adjacent to the corresponding end of each storage frame 24. A carrier 27 is disposed in each aisle between each pair of storage frames 24 and 25 and is movable from a position between the P & D station and the auxiliary loading station along the associated aisle.

The conveyor 21 has a plurality of conveyor stations 28 which are disposed respectively opposite the P & D stations 22. The transfer apparatuses 20A, 20B, and 20C each include a transfer cart 30 which is movable between one of said conveyor stations and a corresponding P & D station.

Referring now particularly to FIGS. 2 and 4, the storage frames 24 and 25 are mirror images of each other and comprise inner rows of aisle posts 33, disposed immediately adjacent to the carrier path of travel, and laterally outer posts 34. Both the aisle posts and the outer posts are aligned in row parallel with the aisle and are laterally respectively aligned in such manner as to provide a multiplicity of bays 35. The bays are divided vertically into different levels by load supports 36 each comprising a pair of spaced, laterally directed, channel member 37. Arms 38, disposed parallel with the adjacent aisle, are welded or otherwise suitably secured to opposite sides of laterally aligned posts 33 and 34 at the different levels for mounting the channel member 37 in spaced relation to the posts. The channel members 37 have their flanges directed inwardly of the adjacent bay and toward each other with their webs welded or otherwise suitably secured to the distal ends of the arms which project forwardly and rearwardly beyond their associated posts. The upper surfaces of the channel members 37 and portions of the arms 38 serve to support a load placed in a selected bay at a selected level by the carrier 27. The endmost aisle post 33 and outer posts 34 have half arms 38a since they need support channel members 37 on only one side of the associated posts (FIG. 5).

The carrier 27 moves along the aisle on a base track 40 (FIG. 4), mounted upon any suitable base surface, and an overhead track 41 mounted to laterally directed beams 42 which connect the storage frames 24 and 25 across their tops. The carrier travels on wheels 43 which roll along the base track and is held in alignment with said base track and the overhead track 41 by pairs of laterally disposed rollers 44 and 45 respectively. Vertical masts 46 extend from the rollers 44 to the rollers 45, and a vertically movable frame 47 is adapted for movement up and down said masts. The masts have laterally directed stabilizers 48 carrying rollers 49 on vertical axes at their distal ends. Said rollers are disposed within a downwardly open, channel shaped stringer 50 which is disposed parallel with the aisle and is secured to the aisle posts 33 of the storage frame 24. The vertically movable frame 47 carries a laterally movable extractor 51 carrying rollers 52. When the extractor moves laterally at a selected load support, the rollers 52 enter the channel members 37 for depositing a load at the selected load support. It will be understood that the various elements of the carrier 27 have preferably electric motor means and suitable transmission means whereby to perform the various movements described, and the upper ends of the masts 46 carry electrical contact means generally indicated at 53 for supplying current to said motors. A complete disclosure of the carrier is set forth in the aforementioned copending application.

Referring again to FIGS. 2 and 4, the auxiliary loading station comprises a pair of short aisle posts 55 and a pair of outer posts 56 arranged to define a rectangle in plan and disposed just beyond the forwardly directed end of the storage frame 24. Laterally directed channel members 57, identical with the channel members 37, are secured to the inner surfaces of the aisle posts 55 and the outer posts 56. The channel members 57 are disposed at the same level as the bottom level of the storage frames, and the posts 55 and 56 are cut off whereby their upper ends are coplanar with the upper supporting surfaces of the channel members 57. The carrier extractor 51 is movable into the channel members 57 in the same manner that it is movable into the channel members 37 for depositing or removing a load at said auxiliary loading station. The station 26 provides means for separately delivering a load to or removing it from the storage frames without utilizing one of the transfer apparatures 20A, 20B, and 20C or the conveyor 21.

The transfer apparatus 20A (and of course, also, the apparatuses 20B and 20C) as herein illustrated comprises basically the transfer cart 30 and a pair of spaced, parallel rails 60 mounted upon a common base surface with the conveyor and the storage frames and extending from beneath the P & D station 22 to beneath the conveyor station 28. The P & D station 22 comprises, generally, a load support directly opposite the auxiliary loading station 26 having channel members adapted to receive the extractor 51 in the same manner as the channel members 37 and 57. The conveyor 21 is basically conventional in design having power driven rollers for conveying loads therealong. However, both the P & D station and the conveyor at the conveyor station 28 are modified and specifically adapted to be cooperant with the transfer cart 30. Therefore, for the purpose of description a reference to the transfer apparatus 20A is generally intended to include the P & D station 22 and the conveyor station 28 insofar as the two latter portions are specifically adapted to cooperate with the transfer cart 30.

As shown in FIGS. 4, 5, 7 and 9, the P & D station 27 is a structure made preferably from tubular steel material of rectangular section and is so constructed as to have openings therein in alignment with the rails 60. The structure of the P & D station comprises four vertically disposed, outer posts 62 disposed with two on either side of the pair of rails 60 in such manner as to define the corners of a rectangle. The lowermost ends of said posts on either sides of the rails are connected by elongated base members 63 respectively which rest upon a ground or floor surface. The two rearmost posts 62, disposed adjacent to the storage frame 25, are laterally connected adjacent to their upper and lowermost ends by cross beams 64 and 65 respectively. The upper cross beam 64 is spaced downwardly from the upper ends of the posts a substantial distance, and the lowermost cross beams 65 is spaced upwardly a sufficient distance to clear the tracks 60. At the level of the upper cross beam 64, each pair of outer posts 62 on either side of the rails 60 is connected by a longitudinal brace 66 which is parallel with the associated base member 63 and the rails 60.

The forwardly directed faces of the rear posts 62 and the rearwardly directly faces of the forwardly positioned posts 62, adjacent the upper end of said posts, carry short channel sections 67 supported therebeneath by channel supports 68. Each channel support 68 rests upon and is secured to the adjacent longitudinal brace 66 and is disposed flatwise against and secured to the adjacent post 62. Each channel section 67 is supported by one of the channel supports 68, and both the channel sections and channel supports at each post are directed inwardly in the direction of the adjacent rail 60. The channel sections 67 are of the same size and shape as the channel members 37 or 57 and are disposed at the same level as the channel members 57. They are so spaced by the posts 62 as to receive the extractor 51 of the carrier 27.

Between the rails 60 there are provided two upright posts 70 aligned with the rearward post 62. The posts 70 are secured to the cross beams 64 and 65 and have projecting horizontally forwardly therefrom center supports 71. Said center supports are braced by diagonal structs 72 respectively (FIG. 5) connected beneath said center supports and angled downwardly and rearwardly to the lowermost end portions of the posts 70. Bracing is provided for the posts 70 in the form of diagonal struts 73 which are connected to the posts at about the level of the center support 71 and project rearwardly and downwardly whereby their lowermost ends are secured to portions of the track 60 which project under the first bay of the storage frame 25.

The distal ends of the center support 71 carry vertically disposed end members 74 which project upwardly to a level coplanar with the upper ends of the posts 62 and 70. The center supports 71 carry laterally directed channel sections 75 supported therebeneath by channel supports 76 in generally the same manner as the channel sections and channel supports 67 and 68. The channel supports 76 are bridged across the center supports 71 against the end members 74 and the posts 70 respectively, and the channel sections 75 are mounted upon said channel supports. The channel sections 75 are longitudinally aligned with the channel sections 67 in such manner that the extractor 51 of the carrier 27 can be propelled into the P & D station in the same manner that it is moved into a pair of co-operant load supports 37 of the storage frame or the load supports 57 of the auxiliary loading station 26. Adjacent aligned channel sections 67 and 75 are spaced from each other above the rails 60 to allow the transfer cart 30 to move literally into the P & D station 22 in a manner to be herein later fully discussed.

The upper surfaces of the channel sections 67 and 75 serve as supporting means for a load disposed at the P & D station as illustrated in broken line in FIG. 5. The posts 70 have an additional brace member 77 mounted to their rearwardly directed surfaces adjacent to the upper ends of said posts parallel with the channel sections 75. As herein illustrated, the brace member 77 is channel shaped in section with one flange thereof being coplanar with the upper ends of the posts 70 and the upper flanges of the channel sections 75. A roller housing 78 is mounted upon the upper surface of the brace member 77, said roller housing comprising a tubular member of rectangular section disposed parallel with the brace member 77.

As shown in FIG. 7, the forwardly directed wall of the roller housing 78 has a pair of preferably rectangular apertures 79 adjacent to the proximal ends of the center supports 71. A pair of pivot pins 80 are mounted vertically through the upper and lower walls of the roller housing 78 directly behind the apertures 79. These pivot pins each carry a roller 81 of such diameter that the circumference thereof projects forwardly a short distance beyond the forwardly directed wall of the roller housing 78. The rollers 81 serve as stop means when a load is being delivered by the transfer cart 30 into the P & D station whereby the load will stop at a definite point and will be properly squared with the channel sections 67 and 75 for subsequent pick-up by the carrier 27. The rollers also serve as guide means along one edge of the load when it is being transferred onto the P & D station from the carrier or when it is being removed therefrom.

The conveyor 21 is positioned parallel with the row of P & D stations 22 and extends past all of said stations. It may be of any additional length desired for conveying loads from a remote position to one of the storage frames or from one of said storage frames to a selected remote position. As shown in FIG. 2, the conveyor is adapted to move loads from left to right or in the direction indicated by the arrows on said conveyor. The conveyor comprises a continuous, elongated sprocket housing 85 along one edge and parallel, spaced side members 86 along the opposite side. The side members 86 are spaced from each other at their ends whereby they terminate in either direction just outside of the rails 60 opposite each P & D station. The sprocket housing 85 and the side members 86 are spaced upwardly from the floor surface and are supported in a conventional manner by suitable leg means 87.

The portions of the conveyor opposite the P & D stations at the conveyor stations 28 have special support structures which partially fill the gaps between the side members 86. This structure comprises four posts 90 (FIGS. 5 and 8) arranged to define the corners of a rectangle and positioned just inside the rails 60. The front or forwardly positioned posts 90 are disposed directly beneath the sprocket housing 85 and the rearwardly positioned posts are spaced therefrom a short distance, preferably less than half the width of the conveyor. A pair of forwardly cantilevered, preferably channel shaped supports 91 are disposed with their web portions flatwise against the inner surfaces of the posts 90 and project rearwardly immediately beneath the sprocket housing 85. Lateral supports 92 are connected across the forwardly disposed pair of posts 90 and the rearwardly disposed pair of said posts immediately beneath the supports 91. The sides and the front of the boxlike frame defined by the posts 90 are additionally reinforced by diagonal braces 93. The rearwardly directed, distal ends of the supports 91 have bridged thereacross, on their upper surfaces, side sections 94 which are aligned with the side members 86 and which terminate at their ends just inside the rails 60 as shown in FIGS. 2 and 9.

The sprocket housing 85 comprises a relatively deep channel member 95 having its open side directed forwardly and having disposed therein a relatively shallower channel member 96 which serves as a front wall for said sprocket housing. The side members 86 and the side sections 94 are preferably shallow, channel shaped members having their open sides directed rearwardly. Between the side members or side sections and the channel member 95 of the sprocket housing 85, there are mounted a plurality of conveyor rollers 97 the forwardly directed ends of which project into the sprocket housing 85; and each forwardly directed end of each conveyor roller carries a pair of sprockets 98 and 99. As well shown in FIG. 9, the sprockts 98 of adjacent pairs of conveyor rollers are connected by sprocket chains 100, and the sprockets 99 of adjacent pairs of said rollers are connected by sprocket chains 101. The conveyor 21 has mounted therebeneath, at one point, a motor M which is directly connected to two of the conveyor rollers 97a and 97b by suitable transmission means such as belts or chains 102 and 103 respectively. It will be readily understood that the conveyor rollers 97a and 97b are rotatably driven directly by the motor M and that all of the other conveyor rollers 97 are remotely driven by the sprocket chains 100 and 101 and the sprockets 98 and 99.

The transfer cart 30 (FIGS. 2, 5–7 and 12–14) has a frame 100 comprising a pair of parallel side members 111 laterally connected inwardly from the ends thereof by a pair of cross members 112 welded or otherwise suitably secured to the side members. The side members have forwardly and rearwardly, longitudinally projecting wheel mounts 113 disposed on either side of the side members and extending beyond the ends of the side members sufficiently to mount wheels 114 therebetween. The lateral spacing of the side members 111 is such that the wheels 114 rollingly engage the rails 60.

Adjacent to the ends of the side members 111 there are provided mounting plates 115 upon each of which is securely mounted a vertically acting cylinder and piston motor 116. The motors 116 have upwardly projecting piston rods 117 having upper, bifurcated ends 118. A load support bar 119 is bridged across each pair of the motors 116 associated with one of the side members 111 respectively. Said load support bar has a downwardly projecting rib 120 which interfits the bifurcated ends 118 of the associated piston rods 117 and is mounted thereto by means of pins 121. The ribs 120 are connected together by a U-shaped yoke comprising downwardly projecting arms 123 connected at their upper ends respectively to the central portions of said ribs and joined at their distal ends by a cross brace 124. As shown in FIG. 13, each arm 123 is reinforced by a pair of oblique braces 123a connected to the associated rib.

The load support bars 119 are vertically movable by the cylinder and piston motors 116 between a lowered position as shown in FIGS. 5 and 7 and a raised position as shown in FIGS. 6 and 13. In the lowered position, the upper surfaces of the load support bars are disposed below the upper level of the conveyor rollers and in the raised position, the load support bars are disposed above the level of said rollers. The upper supporting surfaces of the channel sections 67 and 75 are at the same level as the tops of the rollers whereby the support bars 119 are movable above and below them also. FIG. 6 shows the cart 30 with its support bars raised with a load L resting upon pallet P supported by said bars above the level of the rollers 97 with said cart positioned at a conveyor station 28. The openings between the side members 86 and the side sections 94 afford a passage whereby the load support bars and the upper ends of the motors 116 can pass between adjacent rollers 97 and the car can move literally into the conveyor. The rearmost posts 90, which form part of the support structure for the supports 91, are far enough to the left as seen in FIG. 6 that the most forwardly disposed cross member 112 of the transfer cart will clear said posts when the cart is at the conveyor station.

It will be readily seen from the foregoing that the transfer cart can be moved into a conveyor station 28 beneath a load with the support bars lowered to subsequently lift said load from the conveyor. Also, when the support bars are in the raised position, the cart can carry a load into said station above the rollers 97 to subsequently deposit the load upon the conveyor when the load support bars are lowered. The same type of operation is effective to load or unload at the P & D station. The empty transfer cart may be moved into the P & D station beneath the load thereon to lift it therefrom or it may carry a load to the P & D station and deposit it thereat.

Referring now to FIGS. 7 and 8, a trough member 61 is provided alongside each rail 60 between said rails. The rails themselves preferably comprise tubular members of rectangular section affording a smooth, flat upper surface for the wheels 114 to roll on. The trough members 61 may be channel shaped stock having their open sides directed upwardly to afford troughs alongside the adjacent rails.

Between the trough members 61, there is provided a chain return housing 125 and immediately alongside thereof a central trough member 126. A chain anchor member 127 (FIG. 10) is securely bolted to the lower surfaces of the cross members 112 of the transfer cart and projects downwardly into said central trough member. Both ends of the anchor member have chain anchors 133 welded or otherwise suitably secured to the lower surface of said guide bar and projecting longitudinally beyond the ends thereof. The outer ends of the chain anchors 133 are bifurcated to receive a connector 134 secured thereto by a pin 135 at one end and connected to a chain 136 at the other end thereof.

As shown in FIG. 9, the chain 136 extends from one connector 134 of the anchor member 127 through the central trough member 126 to a drive sprocket 137, around said drive sprocket and through the chain return housing 125, around an idler sprocket 138, and back through the captive rail member 126 to the opposite end of said anchor member. The drive sprocket 137 is preferably positioned beyond the P & D station 22 within the first bay of the storage frame 25 and is rotatably driven by a suitable motor 139. The idler sprocket 138 is mounted beneath the conveyor 21. The motor 139 is reversible in such manner as to move the anchor member 127 and the transfer cart 30 in either direction from P & D station to conveyor or from conveyor to P & D station.

Stabilizing or guide means for maintaining the cart 30 upon the rails 60 is mounted to the inside of the right-hand side member 111 as illustrated in FIGS. 7 and 12–14. Said stabilizing or guide means comprises a horizontal bar 128 rigidly secured adjacent to the ends thereof to the bottoms of a pair of supporting blocks 129. Said blocks are, in turn, securely fixed to the inner surface of the side member 111 by bolts 130 or other suitable means.

The supporting blocks 129 project inwardly over the adjacent trough member 61 whereby the bar 128 is disposed immediately over said trough member. The ends of said bar project a short distance beyond the blocks 129 and carry axially vertically disposed rollers 131 which project downwardly into the adjacent trough member 61 from the lower surface of said bar. The rollers 131 engage the inner side surfaces of said trough member thereby stabilizing and guiding the transfer cart 30 upon the rails 60.

The transfer cart 30 carries certain limit switches to be herein later described. Conductor means for the limit switches is provided in the form of a rigid, electrical conduit 140 most of which is slidably disposed within the left hand trough member 61 (as seen in FIG. 7) and which is connected at one end to the rearmost cross member 12 by a retainer 140a as best shown in FIG. 12. The main body of the conduit 140 extends rearwardly through the trough member and has a vertically upturned portion 142 at its rearmost end. The upper end of the upturned portion 142 carries a junction box 143, and another junction box 144, which is suitably connected to a source of electrical supply (not shown), is mounted upon the first aisle post of the storage frame 25 adjacent to the P & D station 22. Coiled, resilient conductors 145 and 146 (FIG. 9) are connected between the junction boxes 143 and 144 to supply electrical current to the conduit 140. As the transfer cart moves between the conveyor station and the P & D station, the conduit 140 slides in the trough 61 and the junction box 143 moves toward or away from the junction box 144. The coiled conductors 145 and 146 have such resilience as to be extendible a distance equal to the maximum forward and rearward movement of the transfer cart.

The right hand trough member 61 (FIG. 7) similarly slidably carries a flexible pneumatic hose 150 connected at one end to the rearmost cross member 112 by a retainer 150a (FIG. 12). The hose 150 supplies pressure fluid for actuating the cylinder and piston motors 116 through suitable valve means (not shown). The opposite end of the hose 150 is preferably rolled upon a self winding reel 152 mounted in any suitable manner, preferably within the storage frame 25 at about the fourth bay, whereby said hose can be unreeled or reeled into or out of the trough 61 to slide therethrough as the cart moves back and forth along the rails 60. It will be understood that the reel 152 is of a type having suitable means for supplying a pressure fluid to the hose 150 from any suitable source (not shown).

Adjacent to each conveyor station 28, the conveyor 21 is provided with a vertically extendible load stop 155 which projects upwardly from a housing 156 mounted just beneath the rollers 97 to suitable portions of the leg means 87 (FIG. 8). The load stop 155 is preferably solenoid operated to move upwardly and downwardly and is positioned between a pair of adjacent conveyor rollers 97. The uppermost edge of said load stop is disposed below the upper level of the rollers when in a retracted position and extends upwardly a substantial distance thereabove in the extended position. The purpose of the load stop is to stop a load moving along the conveyor at a particular conveyor station 28 from which point it can be subsequently transferred by the cart 30 to a P & D station.

In the general operation of a transfer apparatus 20A, 20B, or 20C, a transfer cart 30 with its load support bars 119 lowered is positioned at a conveyor station 28 beneath a load held by the load stop 155. The load support bars are subsequently raised thereby lifting the load off of the conveyor, and the cart is then moved along the rails 60 into a P & D station 42. The support bars 119 are then lowered thereby leaving the load at the P & D station after which the transfer cart is moved back to the conveyor. It will be evident that a cart may be as readily used to pick up a load from a P & D station and move the same onto the conveyor. A park position just outside the conveyor is preferably provided for parking the transfer cart when it is not in use or for manually loading or unloading it (FIGS. 2 and 5).

The extent of movement of a transfer cart 30 in the direction of the P & D station is preferably regulated whereby the cart moves into said P & D station slightly further than is necessary to position its load at said station. This causes the pallet P to strike the rollers 81 a moment before the cart stops its rearward movement thereby assuring that the load will be positioned firmly against the rollers and properly squared with the P & D station. This places the load in the optimum position to be picked up by a carrier 27 for storage at a selected load support of a storage frame assembly 23.

Figure 15:
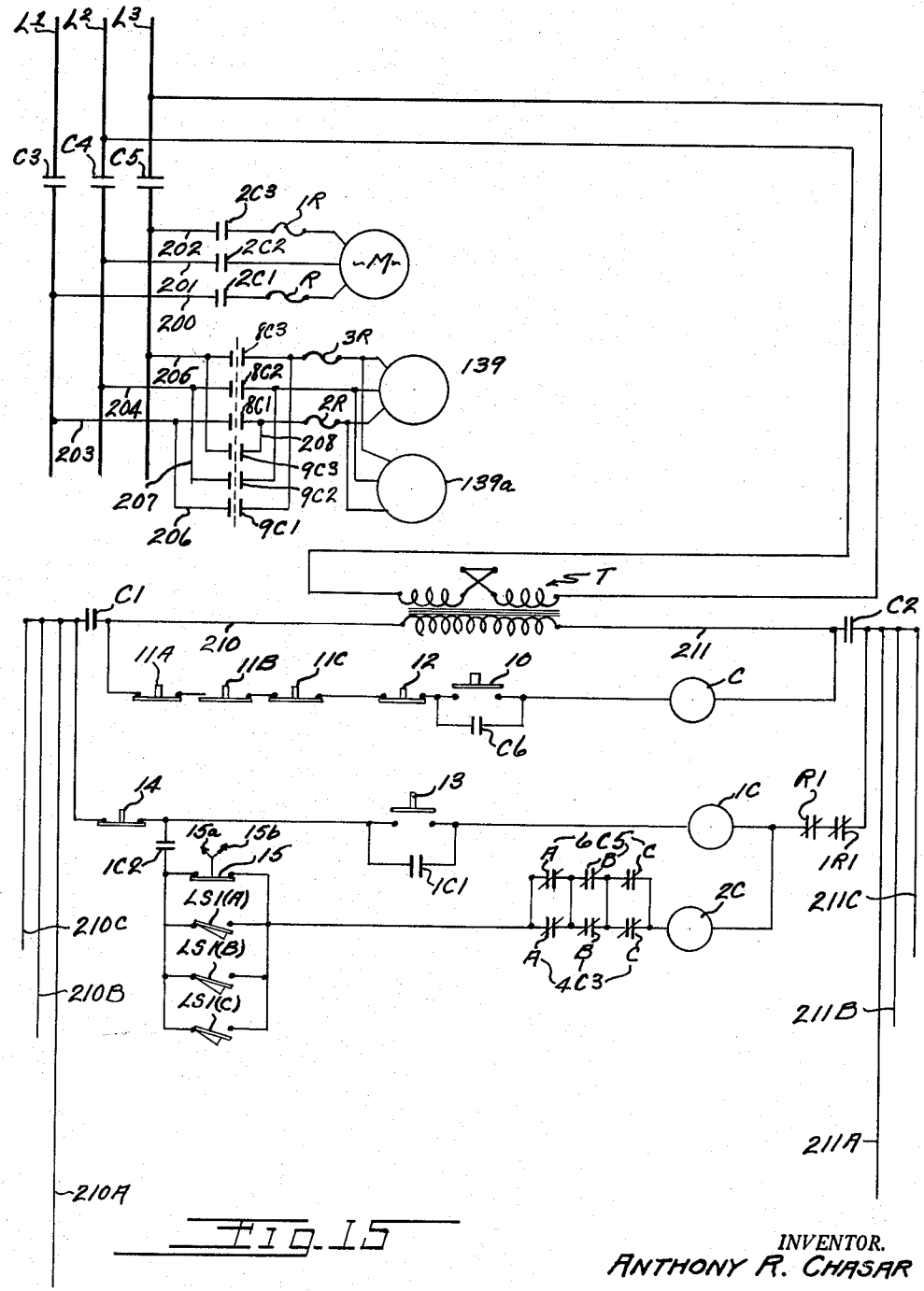
FIGS. 15 and 15a constitute an electrical diagram of means for controlling and operating the transfer apparatus of this invention.
Figure 15B:
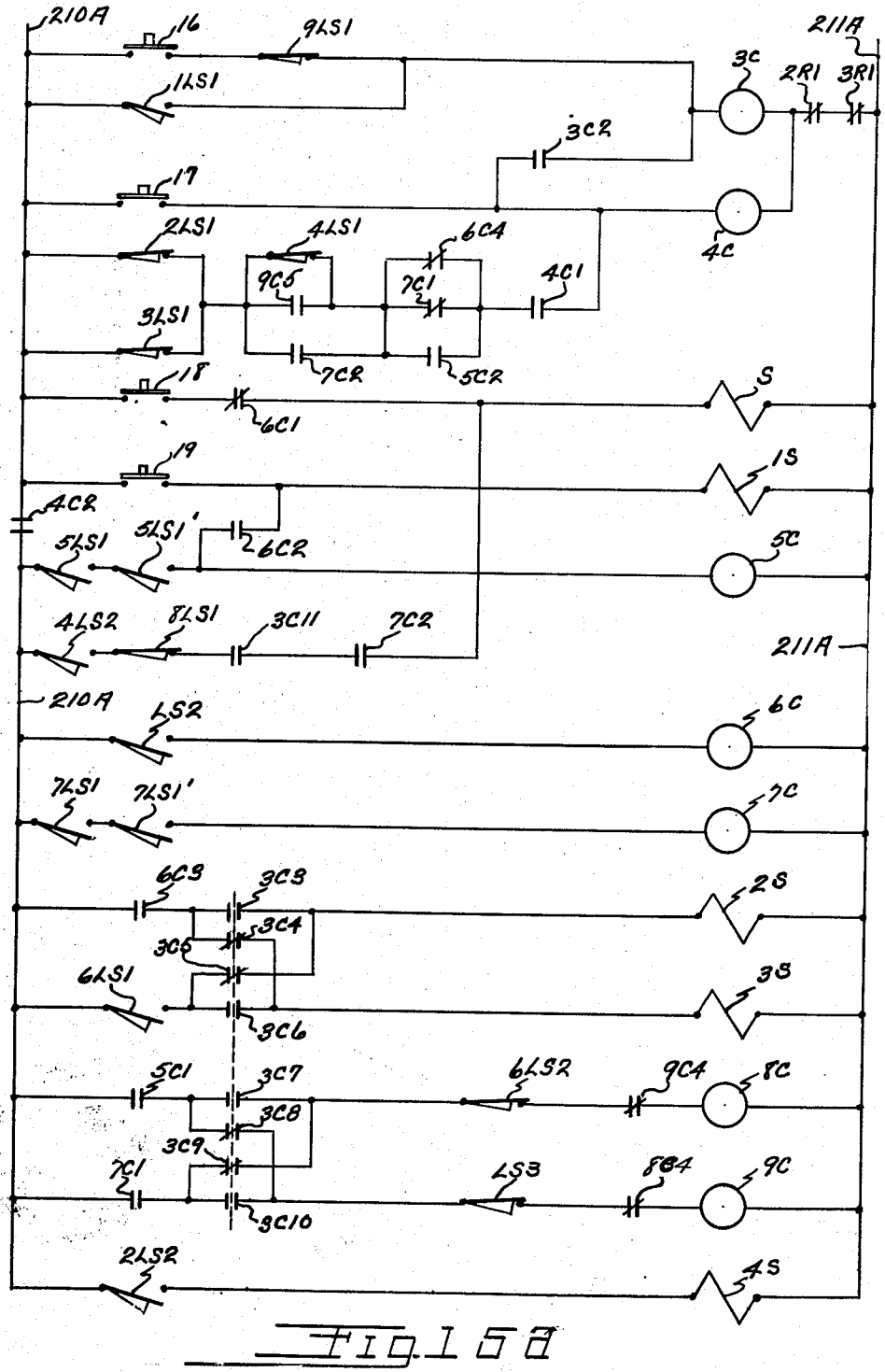

The control system for the conveyor 21 and the transfer apparatus 20A is shown in FIGS. 15 and 15a. These two figures of the drawings constitute a single electrical diagram wherein FIG. 15a is merely a continuation of that shown in FIG. 15. FIG. 15 includes the conveyor motor M, the cart motor 139, the main starting and stopping circuits, and the conductor arrangements for immediately operating the conveyor. FIG. 15a shows control means for controlling the movement of the transfer cart 30 of the transfer apparatus 20A, and it will be understood that additional wiring systems identical to that shown in FIG. 15a (not shown) would be provided for each of the other transfer apparatuses 20B and 20C. Since the purpose and function of the control means for individual transfer apparatus is identical, only that pertaining to the transfer apparatus 20A is shown and described in detail.

In the wiring diagram of FIGS. 15 and 15a, it will be understood that the control elements indicated are so mounted, located, and adapted as to respond to or effect a response in various movable parts and elements of the transfer apparatus of this invention. The limit switches are shown in simplified, semi-diagrammatic form in FIGS. 2 and 5 to indicate their general location, it being understood that such switches are made to respond to the positions of two relatively movable elements, as indicated by the disclosure, in any suitable manner. Only the contacts of these limit switches are indicated in the diagram of FIGS. 15 and 15a. The coils are adapted to close and open various sets of contacts upon energization thereof to set up suitable circuits for operating or stopping the conveyor, moving the transfer cart in either direction along the rails 60, directing the raising or lowering of the transfer cart support bars, or raising or lowering of the load stops 155. The solenoids will be understood to either directly effect the movement or response assigned to them or effect such response through some other, conventional nonelectrical element such as a valve or the like (not shown), as in the case of causing the cylinder and piston motors 116 to raise or lower the load support bars 119.

Referring now to FIG. 15, the electrical current for the entire control system is provided through three main lines L1, L2, and L3 from any suitable source of three phase current (not shown). The conveyor motor M is connected to the main lines L1, L2, and L3 by conductors 200, 201, and 202 respectively. The cart motor 139 is similarly connected to the main lines by conductors 203, 204, and 205 respectively. The cart motor 139 is, of course, a reversible motor and suitable reversing circuits therefor are provided through conductor 206 (across 203 and 205), 207 (in parallel with 204), and 208 (across 205 and 203). A cart motor brake 139a is connected in parallel with the cart motor 139 and is so adapted that when said cart motor is energized, the brake is also energized to the released position and whenever said motor is de-energized, said brake automatically returns to a braked position. In other words, whenever the cart 30 is moved in either direction by energization of the cart motor 139, the brake 139a, which is normally closed, is released to allow movement of the cart.

The primary winding of a transformer T is connected across the main lines L2 and L3, and control lines 210 and 211 coming from the secondary winding of said transformer provide current for the control circuits to the conveyor and to the transfer apparatus. All of the control circuits for the entire control system are connected across these two lines 210 and 211 including three parallel wiring systems of the type shown in FIG. 15a for the three transfer apparatuses 20A, 20B, and 20C. The wiring system of FIG. 15a is connected across branch lines 210A and 211A coming from the lines 210 and 211 respectively. The additional wiring systems for the apparatuses 20B and 20C would be similarly connected across parallel branch lines 210B–211B and 210C–211C respectively.

For the purpose of the following description, all contacts of both manual switches and limit switches and all contacts actuated by relay coils or otherwise are shown in their normal or untripped positions. In other words, all normally open switches or contacts are shown in the open position and all normally closed switches or contacts are shown in the closed position, and the location of any movable element of the entire mechanism may be in that location actuate a limit switch is disregarded in the electrical diagram as illustrated.

The transfer cart 30 has three positions at any one of which it may come to a stop for purposes herein later fully discussed. One position is at the conveyor station 28 (FIG. 2), a second position is the park position just beyond the conveyor in the direction of the P & D station 22 (FIG. 5), and a third position is at the P & D station (FIG. 7). For the purpose of describing the operation of the invention, three cycles or sequences of operation will be described: loading-in from the conveyor to the P & D station, unloading-out from the P & D station to the conveyor, and unloading-out from the park position to the conveyor.

The loading-in sequence consists of the transfer cart 30 picking up a load at the conveyor, transferring it to the P & D station, depositing the load at the P and D station, and returning empty to the conveyor station 28. It will, therefore, be assumed that at the beginning of the sequence, said cart is positioned at the conveyor station 28 and that the conveyor 21 is operating to move loads L and pallets P therealong in the direction indicated by the arrows in FIG. 2.

Assuming that current is available at the main leads L1, L2, and L3 (FIG. 15), the control circuits are prepared for energization by depressing a normally open master starting switch 10 which is connected across the lines 210 and 211 in parallel with the transformer T. This completes a circuit from the line 210 through normally closed, serially connected emergency stop switches 11A, 11B, and 11C, master stop switch 12, said master starting switch 10 and main coil C to line 211. The energization of the main coil C closes normally open contacts C1 and C2 in the lines 210 and 211 respectively whereby current is supplied to the remainder of the control system. The coil C also closes normally open contacts C3, C4, and C5 in lines L1, L2, and L3 respectively which are disposed beyond the terminals of the transformer T and the closing of which makes current available to the conveyor motor M and the cart motor 139. Additionally, the coil C closes normally open contacts C6, which are connected in parallel around the master starting switch 10 and which hold the coil C energized throughout the operation of the apparatus. It will be readily appreciated that if any one of the emergency stop switches 11A, 11B, or 11C is depressed, or the master stop switch is depressed, the coil C will be de-energized and all of the contacts C1 to C6 will open thereby de-energizing the entire control system. With contacts C6 open, reclosing of one or all of the stop switches will not re-energize the main coil.

The emergency stop switches 11A, 11B, and 11C would preferably be mounted at convenient locations adjacent to the transfer apparatuses 20A, 20B, and 20C respectively whereby an operator in the area of any one of said apparatuses would be able to quickly shut down the entire system in an emergency. The master stop switch 12, along with the master start switch 10, is preferably located at a remote position from the transfer apparatuses such as a control station 220 shown at the left in FIG. 2.

Movement of the conveyor 21 is initiated by closing a normally open conveyor start switch 13 also connected across the lines 210 and 211 in parallel with the transformer T but connected away from said transformer beyond the contacts C1 and C2 whereby said conveyor cannot be started if the main coil C is not energized. Closing of start switch 13 completes a circuit from the line 210 through a normally closed conveyor stop switch 14, said conveyor start switch 13, a coil 1C, and normally closed contacts R1 and 1R1 to line 211. The normally closed contacts R1 and 1R1 are respectively controlled by thermal overload circuit breaker coils R and 1R respectively disposed in lines 202 and 200 leading to the conveyor motor M. If the motor M becomes overloaded for any reason, one or both of the circuit breaker coils will open its respective contacts and the conveyor 21 will be stopped.

The coil 1C, when energized, closes maintaining or hold contacts 1C1 which are connected in parallel with the conveyor start switch 113 whereby when said conveyor start switch is released and reopens, coil 1C is maintained in an energized condition. A coil 2C is connected in parallel around both the conveyor start switch 13 and the coil 1C, and normally open contacts 1C2 are connected in series with the coil 2C which contacts close when the coil 1C is energized. The coil 2C in turn closes normally open contacts 2C1, 2C2, and 2C3 which are disposed respectively in the lines 200, 201, and 202 leading to the conveyor motor M. Thus when coil 2C is energized, the conveyor 21 operates due to the closing of the contacts 2C1, 2C2, and 2C3. Coil 2C in turn depends upon the energization of coil 1C and the closing of its contacts 1C2 whereby when the conveyor stop switch 14 is manually opened, coil 1C is de-energized, contacts 1C2 open, coil 2C is de-energized and contacts 2C1, 2C2, and 2C3 open to stop the conveyor motor M. The same thing happens if either of the contacts R1 or 1R1 are opened by one of the thermal overload circuit breaker coils R or 1R.

A manual, two position switch 15 is connected in series with the coil 2C between said coil and the contacts 1C2. In the full line position shown by the arrow 15a, the switch 15 is closed, and in the dotted line position of the arrow 15b, said switch is open. The position 15a represents a manual load-in position, and the position 15b represents an automatic load-in position, the significance of which will be herein later fully described.

As shown in FIG. 2, adjacent to each conveyor station 28 there is provided a limit switch, these limit switches being indicated as LS(A), LS(B), and LS(C) corresponding to their proximity to the transfer apparatuses 20A, 20B, and 20C respectively. These limit switches are adapted to be respectively tripped by the associated transfer carts 30 when said carts are at the conveyor station 28. Normally open contacts LS1(A), LS1(B), and LS1(C) of the said limit switches are connected in parallel with the two position switch 15 and in parallel with each other. These normally open contacts are closed when the carts 30 are positioned at the conveyor. It will be readily seen, therefore, that if the two position switch 15 is in the automatic position 15b with its contacts open, the conveyor 21 will not operate unless at least one of the transfer carts 30 is at one of the conveyor stations 28. On the other hand, if the switch 15 is in the position 15a with its contacts closed, then the conveyor 21 will continue to operate regardless of the positions of the transfer carts. For the purpose of the following descriptions (which concerns only the transfer apparatus 20A), it will be assumed that the two position switch 15 is in the position illustrated or that indicated by the arrow 15a.

LOADING-IN, CONVEYOR TO P & D STATION

To load in from the conveyor 21 to the P & D station by means of the transfer apparatus 20A, it is necessary that the adjacent load stop 155 be raised. If it is not raised, this may be effected by depressing a manual, normally open switch 18 which completes a circuit from the line 210A through said switch, normally closed contacts 6C1, and a solenoid S to the line 211A (FIG. 15a). The solenoid S is mounted in the housing 156 (FIG. 8) and is adapted upon energization to raise said stop. This places the stop 155 directly in the path of a load moving along the conveyor 21 which said load strikes the stop and is held thereby.

With the load stop 155 there is mounted a limit switch 1LS having an operative member disposed in the path of the load to be tripped thereby only when the load abuts said stop. Tripping of the limit switch 1LS closes normally open contacts 1LS1 (FIG. 15a) thereby completing a circuit from the line 210A through said contacts 1LS1, through a coil 3C, and through pairs of normally closed contacts 2R1 and 3R1 to line 211A. The closed contacts 2R1 and 3R1 are controlled by thermal overload circuit breaker coils 2R and 3R respectively disposed in the lines 203 and 205 (FIG. 15) to the cart motor 139. Overloading of the cart motor causes one of the contacts 2R1 or 3R1 to open thereby isolating the coils 3C and 4C and stopping the movement of the cart as will herein later become apparent.

The energized coil 3C closes normally open contacts 3C2 which completes a circuit from the line 210A through contacts 1LS1, said contacts 3C2, a coil 4C, and the contacts 2R1 and 3R1 to the line 211A. Coil 4C closes normally open contacts 4C1 which sets up a holding circuit from the line 210A through either normally closed contacts 2LS1 or 3LS1, normally closed contacts 4LS1, either normally closed contacts 6C4 or normally closed contacts 7C1, contacts 4C1, coil 4C, and contacts 2R1 and 3R1, to line 211A. Energized coil 4C also closes normally open contacts 4C2 disposed in the line 210A.

The transfer cart 30 at the conveyor station 28 holds normally open contacts LS2 of the limit switch LS(A) in closed position. The closing of contacts 4C2 in the line 210A thus completes a circuit from the line 210A through said contacts LS2 and a coil 6C to the line 211A. Energized coil 6C opens normally closed contacts 6C1, thereby isolating the stop raising coil S, and closes normally open contacts 6C2. Normally open contacts 6C3 of coil 6C also close in a line leading to a solenoid 2S adapted for actuating a suitable valve means (not shown) which directs fluid to the cylinder and piston motors 116 to raise the load support bars 119 to their uppermost position. The conductor leading to the support bar raising solenoid 2S is cross connected with a conductor leading to a solenoid 3S which is similarly adapted through suitable valve means (not shown) to lower said support bars. Reversing contacts 3C3, 3C4, 3C5, and 3C6 are disposed in the conductors to the solenoids 2S and 3S and their cross connections which contacts are controlled by the coil 3C. Since the coil 3C is now energized, normally open contacts 3C3 are closed. Therefore, a circuit is completed from the line 210A through the contacts 6C3, contacts 3C3, solenoid 2S to line 211A to raise the support bars 119. The support bar lowering solenoid 3S is meanwhile sufficiently isolated due to the now open contacts 3C4 (opened when coil 3C was energized) and normally open contacts 6LS1.

Referring now to FIG. 15, it will be noted that between the parallel contacts LS1 (A, B, and C) and the coils 2C, there are provided a plurality of normally closed contacts connected in parallel pairs 6C5 and 4C3 with parenthetical designations A, B, or C. Each vertically aligned pair is associated with corresponding transfer apparatuses 20A, 20B, or 20C, and for the present purposes we are concerned only with the contacts subdesignated as (A). Contacts 6C5 are controlled by the coil 6C and the contacts 4C3 are controlled by the coil 4C. Since the coils 4C and 6C are now energized, the normally closed contacts 6C5 and 4C3 are both open. This isolates the coil 2C causing the contacts 2C1, 2C2, and 2C3 to open and stop the conveyor motor M. The conveyor 21 is thereby stopped during the lifting of the load and until such time as the cart moves inwardly toward the P & D station away from the limit switch LS whereby to allow normally open contacts LS2 to open and isolate the coil 6C. De-energization of the coil 6C will, of course, reclose the normally closed contacts 6C4 which in turn re-energizes coil C2 to close the contacts 2C1, 2C2, and 2C3 and again start the conveyor motor M.

When the support bars 119 are moved to their raised position, limit switches 5LS and 5LS', mounted upon the transfer cart 30 and responsive to the upward movement of said support bars respectively are tripped (FIG. 5). These limit switches 5LS and 5LS' have normally open contacts 5LS1 and 5LS1' (FIG. 12a) which when closed complete a circuit from the line 210A through said contacts, contacts 6C2 now closed by coil 6C, and a stop lowering solenoid 1S to the line 211A. The solenoid 1S is mounted in the housing 156 along with the solenoid S in such manner as to positively retract the load stop 155 and the limit switch 1LS whereby they are lowered below the supporting level of the conveyor rollers 97. At the same time, a circuit is formed through the contacts 5LS1 and 5LS1' now closed, and a coil 5C to the line 211A. It should be noted at this point that a normally open, manually operated switch 19 is also available for energizing the solenoid 1S manually.

A coil 8C is provided for causing the cart to move toward the P & D station and a coil 9C is provided for reversing its direction and causing it to move toward the conveyor. Coil 8C controls normally open contacts 8C1, 8C2, and 8C3, in the conductors 203, 204, and 205 respectively leading to the cart motor 139, and the coil 9C controls normally open contacts 9C1, 9C2, and 9C3 in the cart motor reversing conductors 206, 207, and 208 respectively. As shown adjacent the lower portion of FIG. 15a, the lines connecting the coils 8C and 9C are cross connected and have reversing or crossover contacts 3C7, 3C8, 3C9, and 3C10 controlled by the coil 3C. When the coil 5C is energized, it closes normally open contacts 5C1 thereby completing a circuit from the line 210A through said contacts 5C1, normally open contacts 3C7 now closed by the coil 3C, normally closed contacts 6LS2, normally closed contacts 9C4, and the coil 8C to the line 211A. Contacts 8C1, 8C2, and 8C3 to the cart motor 139 thus close to energize said motor to cause the cart to move in the direction of the P & D station. As hereinbefore described, energization of the motor 139 also energizes and releases the cart motor brake 139A. The coil 9C is isolated at this time due to the fact that normally closed contacts 3C8 have been opened by the coil 3C and normally open contacts 7C1 are disposed in the main conductor to the coil 9C. It will also be noted that the coil 8C controls normally closed contacts 8C4 in the conductor leading to the coil 9C and said coil 9C controls normally closed contacts 9C4 in the conductor leading to the coil 8C whereby whenever one of said coils becomes energized, the other is immediately isolated.

As the cart moves in toward the P & D station and away from the conveyor station 28, limit switch LS is released and the normally open contacts LS2 thereof reopen to isolate the coil 6C. This causes the normally closed contacts 6C5 to again close (FIG. 15) whereby the conveyor 21 again starts to operate.

As the transfer cart 30 moves away from the conveyor station 28 and reaches the parked position shown in FIG. 5, it trips a limit switch 4LS thereby opening the normally closed contacts 4LS1 of said limit switch. This breaks the circuit to the coil 4C thereby reopening the normally open contacts 4C2 in the line 210A and isolating the coil 8C which caused the transfer cart to move out of the conveyor station 28. The transfer cart 30 is then stopped at the parked position just inwardly from the conveyor.

If it is desired merely to remove a load from the conveyor without transferring it to the storage frame assembly 23, then the parked position is used for manually or separately unloading the cart. The park position may also be utilized for the purpose of separately loading the cart when it is not desired to pick up a load from the conveyor. The transfer cart may be moved from the conveyor station 28 to the parked position by depressing a manual load-in switch 16 which is connected in parallel with the contacts 1LS1 of the limit switch 1LS which is disposed adjacent to the load stop 155. Closing of the switch 116 will have the same effect as having the limit switch 1LS tripped by a load on the conveyor; the support bars 119 will be raised and the empty cart will move to the park position and stop. Loads may then be manually mounted upon the cart for subsequent movement and deposit at the P & D station in a manner hereinafter to be described.

When the coil 4C was isolated by opening of the contacts 4LS1, the coil 3C was also isolated since both coils 3C and 4C are in parallel with each other beyond the contacts 4LS1 and no other closed path was available for maintaining the coil 3C in energized condition. For continuing movement of the loaded transfer cart 30 in the direction of the P & D station, an operator next depresses the manual load-in switch 16. Coils 3C and 4C are energized as before (when the load struck the limit switch 1LS) and their contacts are reversed from the positions illustrated. As before, this causes the transfer cart 30 to move in toward the P & D station, and as it moves, it moves away from the limit switch 4LS thereby allowing the normally closed contacts 4LS1 to reclose and hold coils 3C and 4C energized. The transfer cart is then able to move all the way over to the P & D station.

At the P & D station 22, the transfer cart 30 trips a limit switch 6LS which controls the normally closed contacts 6LS2 in the conductor leading to the coil 8C adjacent to the lower part of FIG. 15a. Limit switch 6LS2 is thereby opened and coil 8C is isolated whereby the contacts 8C1, 8C2, and 8C3 assume their normally open position to de-energize the cart motor 139. At the same time, normally open contacts 6LS1 are closed to energize the support bar lowering solenoid 3S by completing a circuit from the line 210A through contacts 6LS1, contacts 3C6 held closed by coil 3C, and solenoid 3S to line 211A. Since contacts 3C5 are now open and contacts 6C3 have been opened due to the de-energization of coil 6C when contacts LS2 open, the coil 2S for raising the support bar 119 is now isolated.

As a result of the foregoing, the transfer cart 30 stops at the P & D station and the support bars 119 are lowered by the cylinder and piston motors 116. Lowering of the support bars trips a pair of limit switches 7LS and 7LS' (FIG. 5) which close normally open contacts 7LS1 and 7LS1' to energize a coil 7C by completing a circuit from the line 210A through said contacts 7LS1 and 7LS1' and the coil 7C to the line 211A. The energized coil 7C closes the contacts 7C1 to energize the reversing coil 9C by completing a circuit from the line 210A through the now closed contacts 7C1, contacts 3C10 held closed by the coil 3C, normally closed contacts LS3 of the limit switch LS, normally closed contacts 8C4 now closed due to the de-energization of coil 8C, and the coil 9C to the line 211A. The energized coil 9C closes the normally open reversing contacts 9C1, 9C2, and 9C3 in the conductors 206, 207, and 208 respectively whereby the cart motor 139 reverses direction and the motor brake 139a is simultaneously released. This causes the transfer cart 30 to move outwardly from the P & D station and to travel back to the conveyor station 28.

As the transfer cart passes the park position just inwardly from the conveyor, the limit switch 4LS is again tripped. This opens the normally closed contacts 4LS1 but the coils 3C and 4C are not thereby isolated due to the fact that a pair of normally open contacts 9C5 connected in parallel with the contacts 4LS1 are now closed due to the energization of the reversing coil 9C. This allows the transfer cart to continue on to the conveyor station 28. Tripping of the parking limit switch 4LS also briefly energizes the stop raising solenoid S by closing normally open contacts 4LS2 which completes a circuit from the line 210A through said contacts 4LS2, normally closed contacts 8LS1 of a limit switch 8LS mounted on the conveyor and disposed adjacent to the load stop 155 (FIG. 2), a pair of normally open contacts 3C11 held closed by the energized coil 3C, normally open contacts 7C2 now closed by the energized coil 7C, and the solenoid S to line 211A. This causes the stop to raise just prior to the return of the transfer cart to the conveyor.

When the transfer cart 30 reaches the conveyor station, the limit switch LS is again tripped whereby the contacts LS2 thereof close and energize the coil 6C. Coil 6C opens normally closed contacts 6C4 to isolate the coil 4C and, therefore, also the coil 3C. The parallel connected, normally closed contacts 7C1 cannot carry current to the coil 4C because the coil 7C was energized when the support bars lowered and contacts 7LS1 and 7LS1' closed. A second pair of normally open contacts 5C2 controlled by the coil 5C is also connected in parallel with the contacts 6C4. But the contacts 5C2 are now in a normally open position because the coil 5C is only energized when the support bars 119 are raised and said support bars are presently in the lowered position. De-energization of the coil 4C opens the contacts 4C2 in the line 210A thereby isolating the cart motor coil and the support bar raising and lowering solenoid and the transfer cart 30 is now at rest at the conveyor station 28.

This completes the sequence, LOADING-IN, CONVEYOR TO P & D STATION.

UNLOADING-OUT, P & D STATION TO CONVEYOR

The following sequence would be used in a situation where a load which has been removed from one of the storage frames by the carrier 27 and placed at the P & D station is to be conveyed from said P & D station to the conveyor to be carried thereby to any suitable destination. To prepare for such an operation, the operator would first depress all of the stop lowering buttons or switches 19 of all load stops 155 which are positioned downstream of the particular apparatus 20 which is to be used for transferring the load. For example, if a load were to be conveyed from the P & D station 22 to the conveyor station 28 by means of the transfer apparatus 20C, the load stops adjacent the apparatuses 20A and 20B would be lowered to prevent the load thus transferred from being diverted back into another one of the storage frames. On the other hand, if it is the desire of the operator to transfer a load from one of the storage frames adjacent to the transfer apparatus 20C into one of the storage frames adjacent to the transfer apparatus 20A, then only the load stop at the transfer apparatus 20B would be lowered and the load stop at the transfer apparatus 20A would be maintained in the raised position to automatically divert the load by the latter apparatus in the manner hereinabove described.

As in the first sequence of operation described, it will be assumed that the transfer cart 30 is disposed at the conveyor station 28. The operator then depresses a manually actuatable load-out button 17 (FIG. 15a). This energizes the coil 4C by completing a circuit from the line 210A through said switch 17, said coil 4C, and normally closed contacts 2R1 and 3R1 to the line 211A. It will be noted that the coil 3C is not energized by tripping the load-out button 17, said coil 3C remaining unenergized throughout the unloading-out sequence presently being described. Coil 4C closes its hold contacts 4C1, the contacts 4C2 in the line 210A, and opens the normally closed contacts 4C3(A) (FIG. 15). Closing of the contacts 4C2 immediately energizes the coil 7C because the support bars 119 are lowered thereby holding the contacts 7LS1 and 7LS1' closed. Coil 7C in turn closes the contacts 7C1 thereby energizing the coil 8C. The closing of the contacts 7C1 completes a circuit from the line 210A through said contacts 7C1, contacts 3C9 normally closed because coil 3C is not energized, normally closed contacts 6LS2, contacts 9C4, and said coil 8C to the line 211A. Coil 8C closes the contacts 8C1, 8C2, and 8C3 to cause the motor 139 to propel the transfer cart 30 in the direction of the P & D station. The reversing motor coil 9C is meanwhile isolated by the open contacts 5C1 and 3C10.

As the transfer cart leaves the conveyor station 28, the limit switch LS is released whereby contacts LS2 open and the coil 6C is isolated. As the cart reaches the parked position, limit switch 4LS is again tripped thereby opening normally closed contacts 4LS1 in circuit with the coil 4C. However, 4C remains energized because the now energized coil 7C has closed a pair of normally open contacts 7C2 connected in parallel with the contacts 4LS1. Therefore, the transfer cart proceeds without interruption to the P & D station.

Upon reaching the P & D station, the transfer cart trips the limit switch 6LS thereby opening the normally closed contacts 6LS2 to isolate the coil 8C and stop the inward motion of the transfer cart. At the same time, normally open contacts 6LS1 are closed to energize the support bar raise solenoid 2S by completing a circuit from the line 210A through the contacts 6LS1, normally closed contacts 3C5 closed because coil 3C is not energized, and said solenoid 2S to the line 211A. The result is that the transfer cart stops at the P & D station and the support bars 119 are raised to lift a load from said P & D station.

The raising of the support bars allows the contacts 7LS1 and 7LS1' to open thereby isolating the coil 7C. Contacts 7C1 consequently open as do the contacts 7C2.

The raising of the support bars trips the limit switches 5LS and 5LS' thereby causing the normally open contacts 5LS1 and 5LS1' to close and energize the coil 5C. Coil 5C closes contacts 5C1 and energizes the cart motor reverse coil 9C by completing a circuit from the line 210A through said contacts 5C1, contacts 3C8 closed because coil 3C is not energized, contacts LS3, normally closed contacts 8C4, and the coil 9C to line 221A. This closes the contacts 9C1, 9C2, and 9C3 (FIG. 15) reversing the direction of the cart motor 139 and causing the transfer cart 30 to move outwardly toward the conveyor. As the transfer cart passes the parked position the contacts 4LS1 of the parking limit switch 4LS again open but the transfer cart does not stop at the parked position because the contacts 9C5 which are in parallel with the contacts 4LS1 are held closed by the coil 9C. Therefore, the transfer cart moves directly and without interruption into the conveyor station 28.

At the conveyor station, the transfer cart 30 again trips the limit switch LS thereby closing the contacts LS2 and energizing the coil 6C. Contacts 6C2 immediately close to energize the stop lowering solenoid 1S by completing a circuit from the line 210A through contacts 5LS1 and 5LS1' now closed because the support bars 119 are raised, said contacts 6C2, and said solenoid 1S to the line 211A. Thus if the load stop 155 at the station making the transfer has not previously been lowered, it is at this time. At the same time, coil 6C closes normally open contacts 6C3 to energize the support bar lowering solenoid 3S by completing a circuit from the line 210A through the contacts 6C3, contacts 3C4, and solenoid 3S to the line 211A. This causes the support bars to lower thereby opening the contacts 5LS1 and 5LS1' of the limit switch 5LS and closing the contacts 7LS1 and 7LS1' of the limit switch 7LS to de-energize the coil 5C and energize the coil 7C respectively. The load is at this time deposited upon the conveyor 21.

De-energized coil 5C allows the normally open contacts 5C2 to open, energized coil 6C opens the normally closed contacts 6C4, and energized coil 7C opens the normally closed contacts 7C1. Coil 4C is thereby isolated whereby the contacts 4C2 in the line 210A open to isolate all of the control elements therebelow. The cart is now stopped at the conveyor 21 and the load is conveyed away therefrom by means of said conveyor.

This completes the sequence, UNLOADING-OUT, P & D STATION TO CONVEYOR.

UNLOADING-OUT, PARKED POSITION TO CONVEYOR

When it is desired to place a load on the conveyor from a source other than one of the storage frames, such load may be mounted upon the transfer cart 30 in any suitable manner while said cart is in the parked position. The empty cart may be placed in such parked position from the conveyor station 28 by depressing the manual load-in switch 16 connected in parallel with the contacts 1LS1 of the limit switch 1LS and causing said transfer cart to move out to the parked position in the manner described in connection with the operation sequence entitled LOADING-IN, CONVEYOR TO P & D STATION. This causes the cart to move away from the conveyor in the direction of the P & D station and stop at the park position. The load support bars 119 will be raised even though a load has not actually been lifted off the conveyor. It should be noted at this point that the empty cart in the parked position may also now be manually loaded from a source other than the conveyor for sending the load on to the P & D station. This would be effected by the operator simply pushing the manual load-in switch 16 again and the transfer cart 30 would then proceed to deliver the load to the P & D station in the manner set forth above.

For the purposes of the present sequence, it will be assumed that the transfer cart 30 is in the parked position with the support bars 119 raised and with a load mounted upon said transfer cart. The operator again lowers all of the load stops at all stations downstream from the point of transfer. The operator then pushes the manual load-out switch 17 to energize the coil 4C but to leave the coil 3C de-energized. Coil 4C closes the contacts 4C2 in the line 210A and the coil 5C is immediately energized because the contacts 5LS1 and 5LS1' are closed due to the raised condition of the support bars 119. Coil 5C closes normally open contacts 5C1 whereby the reversing coil 9C is energized. The transfer cart then moves from the parked position to the conveyor station with the load thereon. At the conveyor station, the transfer cart trips the limit switch LS thereby closing the contacts LS2 and energizing the coil 6C. Contacts 6C2 are thus closed to energize the stop lowering solenoid 1S to assure that the stop is down, and contacts 6C3 close to energize the solenoid 3S and lower the support bars 119.

When the support bars lower, contacts 5LS1 and 5LS1' of the limit switch 5LS open to de-energize the coil 5C, and contacts 7LS1 and 7LS1' close to energize the coil 7C. As hereinbefore described, the result is that the contacts 5C2, 6C4, and 7C1 all open to isolate the coil 4C and thereby open the contacts 4C2. The transfer cart then remains at the conveyor station 28.

This completes the sequence UNLOADING-OUT, PARKED POSITION TO CONVEYOR.

Certain safety interlock switches are provided in the present control system to prevent damage to the different elements of the apparatus. For example, the limit switch 8LS (on the conveyor) is adapted to be tripped by a load passing thereover and is held in the tripped position as long as any part of the load is disposed thereover. The limit switch 8LS has normally closed contacts 8LS1 disposed in series with the contacts 4LS2 of the parking limit switch 4LS (FIGS. 2 and 15a). It will be recalled that when the transfer cart is moving outwardly toward the conveyor station 28, it trips the limit switch 4LS thereby closing the contacts 4LS2 and completes a circuit to the stop raise solenoid S. If, however, a load is at that time passing the conveyor station and is deposed over the load stop 155 it will be tripping the limit switch 8LS thereby holding the contacts 8LS1 open. This prevents the stop from being raised if a load is passing thereover at the same time that the transfer cart 30 trips the limit switch 4LS and closes the contacts 4LS2. After the load has passed, the stop may then be raised by closing the manual stop raise switch 18.

Another limit switch 9LS (FIG. 2) is disposed at the P & D station in such position as to be tripped and held in tripped position whenever a load is disposed at said P & D station. Limit switch 9LS has normally closed Contacts 9LS1 disposed in series with the manual load-in switch 16. When a load is on the P & D station 22, the normally closed contacts 9LS1 are held open and depressing the switch 16 is ineffective and prevents an attempt to load at the P & D station when a load is already located there. The possibility of collision between two loads at the P & D station would only occur after a load had been transferred from the conveyor at the conveyor station 28 to the parked position (or the cart has been manually loaded at the parked position) and the operator had subsequently attempted to continue movement of the load onto the P & D station by use of manual load-in switch 16.

Referring again to FIGS. 2 and 12a, a limit switch 2LS is mounted just outside of the P & D station 22 and is adapted to be tripped by the transfer cart 30 just before said transfer cart passes into the P & D station. Another limit switch 3LS is mounted inside the P & D station and is adapted to be tripped by the extractor 51 when said extractor is positioned at the P & D station. As shown in FIG. 15a, normally closed contacts 2LS1 of the limit switch 2LS and normally closed contacts 3LS1 of the limit switch 3LS are connected in parallel with each other in the holding circuit to the coil 4C. If either of the contacts 2LS1 or 3LS1 are closed the circuit to the coil 4C will be maintained insofar as these two contacts are concerned. However, if the extractor is at the P & D station thereby holding the contacts 3LS1 open and the cart 30 approaches said P & D station in an attempt to enter therein, then the contacts 2LS1 of the limit switch 2LS will also be opened whereby the coil 4C will be de-energized and the cart will stop. This prevents collision between the transfer cart 30 and the extractor 51 at the P & D station 22.

The limit switch 2LS also has normally open contacts 2LS2 controlling a solenoid 4S (bottom line, FIG. 15a). Energization of the solenoid 4S reacts in the carrier control system (not herein illustrated) in such manner as to prevent the extractor 51 from entering the P & D station as long as said solenoid is energized. The transfer cart 30 is adapted to maintain the limit switch 2LS in tripped position as long as it is at the P & D station 22 and, therefore, during such period the contacts 2LS2 will be closed. This completes a circuit from the line 210A through said contacts 2LS2 and the solenoid 4S to the line 211A. The contacts 2LS2 insure that as long as the transfer cart is at the P & D station, the extractor 51 of the carrier will not attempt to enter and collide with it.

The purpose of the two position switch 15 is to afford the operator the option of either automatic loading of loads from the conveyor 21 to the storage frame assemblies 23 or personal, selective loading at specific storage frame assemblies by specific transfer apparatuses 20A, 20B, or 20C.

As hereinbefore disclosed, when the two position switch 15 is in the manual position shown and designated by the solid arrow 15a, said two position switch is closed. This will cause the conveyor 21 to operate continuously except, of course, when one of the pairs of parallel contacts 6C5–4C3 (A, B, or C) are both open. In other words, the conveyor 21 will stop only while the transfer cart 30 is picking up a load at the conveyor 21. Under manual control, the operator personally selects a given load traveling on the conveyor and diverts it to a selected load storage frame assembly 23 by depressing a selected stop raise switch 18 and making sure that all of the load stops 155 which are upstream therefrom are in the lowered position, The load will then by-pass all but the selected transfer apparatus 20 at which point it will be diverted to the selected storage frame assembly 23. The operator would use this method, for example, when the loads being carried along the conveyor 21 are of various kinds and it is desired to shuttle or divert loads of a specific kind into a specific storage frame assembly. Under manual control, the operator personally and by sight determines at which station 28 any given load is to leave the conveyor.

In the automatic position designated 15b, the two position switch 15 is open whereby the conveyor 21 will operate only when at least one of the contacts LS1(A), LS1(B), or LS1(C) is closed. These contacts are respectively closed when the transfer carts 30 associated therewith are at their respective conveyor stations 28. This means that the conveyor 21 will operate only if at least one cart 30 is available at one of the conveyor stations 28. As was pointed out in the description of the loading-in cycle, as each cart 30 returns to its respective conveyor station 28, it closes contacts 4LS2 of the limit switch 4LS to automatically raise the associated load stop 155. Under these conditions, a load carried along the conveyor 21 will be automatically stopped by a load stop 155 at the first conveyor station 28 at which a transfer cart 30 is available. Said transfer cart will automatically divert the load to its associated storage frame assembly for further disposition by the carrier 27. As the cart moves away from the carrier, the associated load stop 155 lowers and does not raise again until said transfer cart returns and is again available. The result is that loads may be placed upon the conveyor at any suitable rate and at any desired distance from each other. Each load will be diverted at the first available transfer cart and during the transfer from the conveyor to the cart said conveyor will stop momentarily to prevent collision between the load being transferred and another load following therebehind. As soon as one load is moved away from the conveyor by a transfer cart, the conveyor will resume operation and move the next succeeding load onto the next available transfer cart. If at any time all of the transfer carts 30 are away from the conveyor, all of the contacts LS1 (A, B, and C) will be open and the conveyor will be stopped. This prevents any given load from by-passing all of the transfer apparatuses 20A, 20B, or 20C.

The foregoing discloses one specific embodiment of the present invention. It will be understood that many changes in the details thereof may be made without departing from the spirit of the invention or the scope of the appended claims.

What is claimed is:

1. In a storage means and a remotely situated conveyor for delivering loads to be stored at said storage means, a transfer apparatus comprising means providing a transfer station at the conveyor; means providing a pick-up and delivery station at said storage means; track means connecting said stations; a transfer cart movable in a controlled path between said stations along said track means; said stations having openings therein whereby said cart is movable into said stations; said cart having lift means movable vertically in such manner as to lift a load from or deposit a load at either of said stations; a stop mounted at said conveyor station and movable from an extended position in the path of a load carried by the conveyor to a retracted position out of the path of the load; power means connected to said cart for causing movement thereof along said track means; control means causing said lift means to raise, said cart to move to said pick-up and delivery station, and said lift means to lower at said pick-up and delivery station in use thereof; said cart being normally positioned at said transfer station and said control means including a control element responsive to a load positioned against said stop automatically effecting the raising of said lift means to lift a load from said conveyor and the subsequent movement of said cart to a parked position outside said transfer station.

2. A transfer apparatus for serving a mechanized storage system disposed remotely from a conveyor conveying loads to be stored in said system and wherein the storage system has a carrier for storing loads therein; power means driving the conveyor; a portion of said conveyor comprising means providing a transfer station; means providing a remotely situated pick-up and delivery station adjacent to said system; a transfer cart movable in a controlled path back and forth between said stations; said stations having openings therein whereby said cart is movable into and out of said stations; said cart having lift means capable of lifting a load from or depositing it at either of said stations; said pick-up and delivery station having means for receiving a load carrying extractor of the carrier; an extendible and retractable stop mounted at said transfer station in such manner as to stop a load moving along the conveyor at said transfer station when extended; control means remotely selectively causing said cart to retrieve a load at either station and deliver it to the other station, said stop to extend or retract, and said conveyor to start and stop; said control means including a control element mounted at said pick-up and delivery station actuatable by a load resting thereupon and, when actuated, rendering said control means ineffective to cause delivery of another load to said pick-up and delivery station.

3. A transfer apparatus for serving a mechanized storage system disposed remotely from a conveyor conveying loads to be stored in said system and wherein the storage system has a carrier for storing loads therein; power means driving the conveyor; a portion of said conveyor comprising means providing a transfer station; means providing a remotely situated pick-up and delivery station adjacent to said system; a transfer cart movable in a controlled path back and forth between said stations; said stations having openings therein whereby said cart is movable into and out of said stations; said cart having lift means capable of lifting a load from or depositing it at either of said stations; said pick-up and delivery station having means for receiving a load carrying extractor of the carrier; an extendible and retractable stop mounted at said transfer station in such manner as to stop a load moving along the conveyor at said transfer station when extended; control means remotely selectively causing said cart to retrieve a load at either station and deliver it to the other station, said stop to extend or retract, and said conveyor to start and stop; said control means including a control element mounted at said transfer station actuatable by a load passing said transfer station and, when actuated, rendering said control means ineffective to cause said stop to extend.

4. A transfer apparatus for serving a mechanized storage system disposed remotely from a conveyor conveying loads to be stored in said system and wherein the storage system has a carrier for storing loads therein; power means driving the conveyor; a portion of said conveyor comprising means providing a transfer station; means providing a remotely situated pick-up and delivery station adjacent to said system; a transfer cart movable in a controlled path back and forth between said stations; said stations having openings therein whereby said cart is movable into and out of said stations; said cart having lift means capable of lifting a load from or depositing it at either of said stations; said pick-up and delivery station having means for receiving a load carrying extractor of the carrier; an extendible and retractable stop mounted at said transfer station in such manner as to stop a load moving along the conveyor at said transfer station when extended; control means remotely selectively causing said cart to retrieve a load at either station and deliver it to the other station, said stop to extend or retract, and said conveyor to start and stop; said control means including a first control element actuatable by the extractor positioned in said pick-up and delivery station; a second control element actuatable by said cart prior to its entrance into said pick-up and delivery station; said control elements, when concurrently actuated, rendering said control means ineffective to cause said cart to move into said pick-up and delivery station.

5. A transfer apparatus for serving a mechanized storage system disposed remotely from a conveyor conveying loads to be stored in said system and wherein the storage system has a carrier for storing loads therein; power means driving the conveyor; a portion of said conveyor comprising means providing a transfer station; means providing a remotely situated pick-up and delivery station adjacent to said system; a transfer cart movable in a controlled path back and forth between said stations; said stations having openings therein whereby said cart is movable into and out of said stations; said cart having lift means capable of lifting a load from or depositing it at either of said stations; said pick-up and delivery station having means for receiving a load carrying extractor of the carrier; an extendible and retractable stop mounted at said transfer station in such manner as to stop a load moving along the conveyor at said transfer station when extended; control means remotely selectively causing said cart to retrieve a load at either station and deliver it to the other station, said stop to extend or retract, and said conveyor to start and stop; said transfer appartaus co-operant with a like apparatus having a transfer station at the same conveyor and serving another mechanized storage system disposed remotely from the conveyor; said control means including a first control element actuatable, when said stop is extended, by a load when it abuts said stop; means responsive to actuation of said first control element causing said power means to be inoperative, said lift means to raise, said cart to move outwardly from said conveyor to a park position, and said stop to retract; a manual control element; means responsive to actuation of said manual control element, when said cart is parked, causing said cart to move to said pick-up and delivery station, said power means to become operative, said lift means to lower, said cart to return to said transfer station, and said stop to extend; a second control element actuated by said cart at said transfer station; and means responsive to said second control element and a like control element of said like apparatus, being in unactuated position, causing said power means to be inoperative.

6. In a storage means and a remotely situated conveyor for delivering loads to be stored at said storage means, a transfer apparatus comprising means providing a transfer station at the conveyor; means providing a pick-up and delivery station at said storage means; track means connecting said stations; a transfer cart adapted to be positioned at said transfer station and movable in a controlled path between said stations along said track means; said stations having openings therein whereby said cart is movable into said stations; said cart having lift means movable vertically in such manner as to lift a load from or deposit a load at either of said stations; a stop mounted at said conveyor station and movable from an extended position in the path of a load carried by the conveyor to a retracted position out of the path of the load; power means connected to said cart for causing movement thereof along said track means; control means causing said lift means to raise, said cart to move to said pick-up and delivery station, and said lift means to lower at said pick-up and delivery station in use thereof; power means for moving said conveyor; said control means comprising a first control element responsive to a load on said conveyor abutting said load stop and a second control element responsive to said cart being positioned at said transfer station; said power means of said conveyor responsive to both said control elements whereby when said control elements are concurrently actuated said conveyor stops and prevents movement of other loads toward said transfer station during the lifting of the first mentioned load.

7. In a storage means and a remotely situated conveyor for delivering loads to be stored at said storage means, a transfer apparatus comprising means providing a transfer station at the conveyor; means providing a pick-up and delivery station at said storage means; track means connecting said stations; a transfer cart adapted to be positioned at said transfer station and movable in a controlled path between said stations along said track means; said stations having openings therein whereby said cart is movable into said stations; said cart having lift means movable vertically in such manner as to lift a load from or deposit a load at either of said stations; a stop mounted at said transfer station and movable from an extended position in the path of a load carried by the conveyor to a retracted position out of the path of the load; power means connected to said cart for causing movement thereof along said track means; control means causing said lift means to raise, said cart to move to said pick-up and delivery station, and said lift means to lower at said pick-up and delivery station in use thereof; power means for extending and retracting said stop; a first control element responsive to the raising of said lift means effecting the retraction of said stop means prior to said cart leaving said transfer station; and a second control element responsive to the return of said cart to said transfer station effecting the extension of said stop means whereby said stop means is ineffective to stop a load on said conveyor whenever said cart is away from said transfer station.

8. In a storage means and a remotely situated conveyor for delivering loads to be stored at said storage means, a transfer apparatus comprising means providing a transfer station at the conveyor; means providing a pick-up and delivery station at said storage means; track means connecting said stations; a transfer cart adapted to be positioned at said transfer station and movable in a controlled path between said stations along said track means; said stations having openings therein whereby said cart is movable into said stations; said cart having lift means movable vertically in such manner as to lift a load from or deposit a load at either of said stations; a stop mounted at said transfer station and movable from an extended position in the path of a load carried by the conveyor to a retracted position out of the path of the load; power means connected to said cart for causing movement thereof along said track means; control means causing said lift means to raise, said cart to move to said pick-up and delivery station, and said lift means to lower at said pick-up and delivery station in use thereof; said control means including a first control element responsive to a load positioned against said stop automatically effecting the raising of said lift means to lift the load from said conveyor and the subsequent movement of said cart toward a parked position outside said transfer station; a second control element responsive to said cart positioned at said park position causing said cart to stop thereat; a manual control switch, the actuation of which causes said cart to move directly from said transfer station to said pick-up and delivery station without raising said lift means; said control means including means rendering said second control element ineffective when said cart passes said park position in response to actuation of said manual control switch.

9. In a storage means and a remotely situated conveyor for delivering loads to be stored at said storage means, a transfer apparatus comprising means providing a transfer station at the conveyor; means providing a pick-up and delivery station at said storage means; track means connecting said stations; a transfer cart adapted to be positioned at said transfer station and movable in a controlled path between said stations along said track means; said stations having openings therein whereby said cart is movable into said stations; said cart having lift means movable vertically in such manner as to lift a load from or deposit a load at either of said stations; power means connected to said cart for causing movement thereof along said track means; control means causing said lift means to raise, said cart to move to said pickup and delivery station, and said lift means to lower at said pickup and delivery station in use thereof to transfer a load from said conveyor to said storage means; a carrier associated with said storage means; said carrier having extractor means for moving into and picking up a load at said pick-up and delivery station and storing said load in said storage means; power means for actuating said carrier; said control means including a control element actuated by said transfer cart positioned at said pick-up and delivery station; said power means of said carrier responsive to the actuation of said control element whereby said extractor means cannot move into said pick-up and delivery station when said cart is positioned at said pick-up and delivery station.

10. Apparatus for non-selective transfer of loads from a moving conveyor into a plurality of load storage systems disposed in laterally spaced relation to said conveyor, said apparatus comprising power means for actuating said conveyor; means providing a plurality of transfer stations along said conveyor; means providing a like number of pick-up and delivery stations at said storage systems; said transfer and pick-up and delivery stations arranged in pairs having track means connecting each said pair; a transfer cart adapted to be positioned at each said transfer station and movable in a controlled path between said pair of stations along one of said track means; said stations having openings therein whereby said cart is movable into said stations; said cart having lift means movable vertically in such manner as to lift a load from or deposit a load at either of said stations; a stop mounted at each said transfer station; power means for separately moving each said stop from an extended position in the path of a load carried by said conveyor to a retracted position out of the path of the load; power means connected to each said cart for causing movement thereof along its associated track means; control means for causing each said lift means to raise, each said cart to move to said pick-up and delivery station, each said lift means to lower at said pick-up and delivery station, and each said cart to return to said pick-up and delivery station; said control means including a control element responsive to a load positioned against each of said stops causing the associated one of said carts to raise said load and move it toward a pick-up and delivery station and said stop to retract whereby a first load moving on said conveyor is diverted into a storage system at the first available transfer station having a cart thereat and whereby subsequent loads on said conveyor are allowed to pass over said retracted stop to the next transfer station; and a control element responsive to the return of each said cart from a pick-up and delivery station to a transfer station causing the associated stop thereof to move to its extended position for receiving another load.

11. A transfer apparatus for transferring loads between a conveyor and a mechanized storage system; said storage system having means providing a pick-up and delivery station for receiving loads from said conveyor for further distribution in said system; said conveyor and said station being laterally spaced from each other; said conveyor comprising horizontal load propelling means spaced upwardly above a base surface; said station comprising horizontal load support means disposed parallel with said conveyor and substantially coplanar with said load propelling means; track means mounted on said base surface and extending from beneath said conveyor to beneath said station and disposed substantially perpendicular to said conveyor and said station; a transfer cart mounted upon said track means for movement between said conveyor and said station; said cart having a pair of spaced, horizontal support bars disposed parallel with said track means and generally coplanar with said propelling means and load support means; said cart having lift means for moving said bars vertically between positions slightly above and below the upper surfaces of said load propelling means and load support means; means defining pairs of laterally directed passage means in said load propelling means and said load support means whereby said support bars pass into said conveyor and said station at either end of said track means; control means causing said cart to move between the ends of said tracks means and to raise and lower said bars at said conveyor and said station to pick up or deposit loads at either said conveyor or said station; said cart comprising a base frame disposed adjacent to said track means and having wheels in rolling contact with said track means; said lift means comprising vertically acting cylinder and piston motors disposed at either side of said base frame in pairs aligned with said track means; said bars carried adjacent to the ends thereof by said pairs of motors whereby actuation of said motors reciprocates said bars vertically between said positions; said track means comprising a pair of spaced, parallel rails; said base frame having at least one side member disposed substantially directly above one of said rails; means defining a U-shape, upwardly open channel alongside said one rail; a pair of rollers, mounted on vertical axes and spaced apart in a direction parallel with said one rail, disposed within said channel for rolling contact with the inner vertical walls thereof; and means mounting said rollers to said one side member whereby said cart is maintained in alignment with said track means.

12. A transfer apparatus for transferring loads between a conveyor and a mechanized storage system; said storage system having means providing a pick-up and delivery station for receiving loads from said conveyor for further distribution in said system; said conveyor and said station being laterally spaced from each other; said conveyor comprising horizontal load propelling means spaced upwardly above a base surface; said station comprising horizontal load support means disposed parallel with said conveyor and substantially coplanar with said load propelling means; track means mounted on said base surface and extending from beneath said conveyor to beneath said station and disposed substantially perpendicular to said conveyor and said station; a transfer cart mounted upon said track means for movement between said conveyor and said station; said cart having a pair of spaced, horizontal support bars disposed parallel with said track means and generally coplanar with said propelling means and load support means; said cart having lift means for moving said bars vertically between positions slightly above and below the upper surfaces of said load propelling means and load support means; means defining pairs of laterally directed passage means in said load propelling means and said load support means whereby said support bars pass into said conveyor and said station at either end of said track means; control means causing said cart to move between the ends of said track means and to raise and lower said bars at said conveyor and said station to pick up or deposit loads at either said conveyor or said station; means defining passage means into said load support means disposed at right angles to the first mentioned passage means thereof; said second mentioned passage means adapted to receive lift means of a carrier adapted to retrieve loads from and deliver loads to said pick-up and delivery station for storing or unstoring the loads in said storage system; said control means including means responsive to either of said lift means disposed within one of said passage means preventing the other said lift means from entering the other said passage means.

13. A transfer apparatus for transferring loads between a conveyor and a mechanized storage system; said storage system having means providing a pick-up and delivery station for receiving loads from said conveyor for further distribution in said system; said conveyor and said station being laterally spaced from each other; said conveyor comprising horizontal load propelling means spaced upwardly above a base surface; said station comprising horizontal load support means disposed parallel with said conveyor and substantially coplanar with said load propelling means; track means mounted on said base surface and extending from beneath said conveyor to beneath said station and disposed substantially perpendicular to said conveyor and said station; a transfer cart mounted upon said track means for movement between said conveyor and said station; said cart having a pair of spaced, horizontal support bars disposed parallel with said track means and generally coplanar with said propelling means and load support means; said cart having lift means for moving said bars vertically between positions slightly above and below the upper surfaces of said load propelling means and load support means; means defining pairs of laterally directed passage means in said load propelling means and said load support means whereby said support bars pass into said conveyor and said station at either end of said track means; control means causing said cart to move between the ends of said track means and to raise and lower said bars at said conveyor and said station to pick up or deposit loads at either said conveyor or said station; said cart comprising a base frame disposed adjacent to said track means and having wheels in rolling contact with said track means; said track means comprising a pair of spaced, parallel rails; said base frame having at least one side member disposed substantially directly above one of said rails; means defining a U-shape, upwardly open channel alongside said one rail; a pair of rollers, mounted on vertical axes and spaced apart in a direction parallel with said one rail, disposed within said channel for rolling contact with the inner vertical walls thereof; and means mounting said rollers to said one side member whereby said cart is maintained in alignment with said track means.

References Cited by the Examiner

UNITED STATES PATENTS

| | | |
|---|---|---|
| 318,360 | 6/85 | Davis. |
| 1,775,799 | 9/30 | Young. |
| 1,869,794 | 8/32 | Bell. |
| 1,910,267 | 5/33 | Smith et al. _____ 214—26 |
| 1,973,605 | 9/34 | Buettell et al. _____ 214—16.14 X |
| 2,626,065 | 1/53 | Sanders et al. _____ 214—16.14 |
| 2,717,087 | 9/55 | Auger. |
| 2,802,583 | 8/57 | Dansereau _____ 214—84 |
| 2,828,027 | 3/58 | Stevenson et al. _____ |
| 2,896,800 | 7/59 | Thomas et al. _____ 214—16.42 |
| 2,899,087 | 8/59 | Jacobsen. |
| 3,042,228 | 7/62 | Frangos. |
| 3,049,247 | 8/62 | Lemelson _____ 214—16.42 |

HUGO O. SCHULZ, *Primary Examiner.*

GERALD M. FORLENZA, *Examiner.*